US009598973B2

(12) United States Patent
Ghasripoor et al.

(10) Patent No.: US 9,598,973 B2
(45) Date of Patent: Mar. 21, 2017

(54) SEAL SYSTEMS FOR USE IN TURBOMACHINES AND METHODS OF FABRICATING THE SAME

(71) Applicant: Nuovo Pignone S.r.I., Florence (IT)

(72) Inventors: Farshad Ghasripoor, Glenville, NY (US); Iacopo Giovannetti, Florence (IT); Massimo Giannozzi, Florence (IT); Krishnamurthy Anand, Bangalore (IN); Nuo Sheng, Schenectady, NY (US); Nicole Barbara Piche, Nashua, NH (US); Luc Stephane LeBlanc, Clifton Park, NY (US); Wayne Charles Hasz, Pownal, VT (US); Warren Arthur Nelson, Clifton Park, NY (US); Paul Matthew Thomas, Queensbury, NY (US); Dennis Michael Gray, Delanson, NY (US)

(73) Assignee: General Electric Company, Niskayuna, NY (US)

( * ) Notice: Subject to any disclaimer, the term of this patent is extended or adjusted under 35 U.S.C. 154(b) by 955 days.

(21) Appl. No.: 13/687,369

(22) Filed: Nov. 28, 2012

(65) Prior Publication Data

US 2014/0147242 A1 May 29, 2014

(51) Int. Cl.
*F01D 11/12* (2006.01)
*F16J 15/44* (2006.01)
*F01D 5/28* (2006.01)

(52) U.S. Cl.
CPC ............ *F01D 11/122* (2013.01); *F01D 5/288* (2013.01); *F16J 15/445* (2013.01);
(Continued)

(58) Field of Classification Search
CPC ........ F01D 11/122; F01D 11/12; F01D 5/288; F16J 15/445; F05D 2300/21;
(Continued)

(56) References Cited

U.S. PATENT DOCUMENTS 4,227,703 A * 10/1980 Stalker ...................... F01D 5/20
277/415
4,249,913 A * 2/1981 Johnson ............... C09K 3/1436
415/173.4
(Continued)

FOREIGN PATENT DOCUMENTS

EP 0507049 A2 10/1992
EP 0573928 A1 12/1993
(Continued)

OTHER PUBLICATIONS

PCT Search Report and Written Opinion dated Mar. 25, 2014 issued in connection with corresponding PCT Application No. PCT/EP2013/074893.

*Primary Examiner* — Craig Kim
*Assistant Examiner* — Eldon Brockman
(74) *Attorney, Agent, or Firm* — Pabitra K. Chakrabarti

(57) ABSTRACT

A seal system, for an apparatus that includes a rotatable portion with airfoils coupled thereto and a stationary portion with an inner surface, includes an abradable portion including at least one abradable layer of an abradable material formed over the inner surface. The seal system also includes an abrading portion disposed over at least a portion of a substrate of the airfoil. The abrading portion includes at least one abrading layer formed on at least a portion of the substrate and a plurality of abrasive particles embedded within the abrading layer. The plurality of abrasive particles includes at least one of substantially all of one of tantalum carbide (TaC), aluminum oxide ($Al_2O_3$), and ziconia ($ZrO_2$), cubic boron nitride (cBN) and $Al_2O_3$ in predetermined
(Continued)

ratios, cBN, $Al_2O_3$ and $ZrO_2$ in predetermined ratios, $Al_2O_3$ and $ZrO_2$ fused together in predetermined ratios, and TaC and $Al_2O_3$ in predetermined ratios.

22 Claims, 11 Drawing Sheets

(52) U.S. Cl.
CPC ...... *F05D 2230/31* (2013.01); *F05D 2300/21* (2013.01); *F05D 2300/226* (2013.01); *F05D 2300/228* (2013.01); *F05D 2300/506* (2013.01); *Y02T 50/672* (2013.01)

(58) Field of Classification Search
CPC ......... F05D 2300/228; F05D 2300/506; F05D 2300/226; F05D 2230/31
See application file for complete search history.

(56) References Cited

U.S. PATENT DOCUMENTS

| | | | |
|---|---|---|---|
| 4,851,188 A * | 7/1989 | Schaefer | B22F 7/062 29/889.71 |
| 5,059,095 A * | 10/1991 | Kushner | C23C 4/02 29/889.21 |
| 5,064,727 A | 11/1991 | Naik et al. | |
| 5,076,897 A * | 12/1991 | Wride | B24D 99/00 205/110 |
| 5,551,959 A | 9/1996 | Martin et al. | |
| 5,704,759 A | 1/1998 | Draskovich et al. | |
| 5,935,407 A * | 8/1999 | Nenov | C23C 28/00 205/103 |
| 6,089,825 A | 7/2000 | Walden et al. | |
| 6,190,124 B1 | 2/2001 | Freling et al. | |
| 6,194,086 B1 * | 2/2001 | Nenov | C23C 28/00 416/241 B |
| 6,358,002 B1 | 3/2002 | Good et al. | |
| 6,423,432 B1 | 7/2002 | Torigoe et al. | |
| 6,432,487 B1 | 8/2002 | Graham et al. | |
| 6,773,817 B1 | 8/2004 | Sagel et al. | |
| 6,887,036 B2 | 5/2005 | Ohara et al. | |
| 6,887,528 B2 | 5/2005 | Lau et al. | |
| 6,896,485 B2 * | 5/2005 | Ohara | C25D 15/02 415/173.4 |
| 7,354,651 B2 | 4/2008 | Hazel et al. | |
| 7,442,444 B2 | 10/2008 | Hazel et al. | |
| 7,449,254 B2 | 11/2008 | Spitsberg et al. | |
| 7,718,280 B2 | 5/2010 | Wilson | |
| 7,927,189 B2 | 4/2011 | Grady et al. | |
| 8,047,773 B2 | 11/2011 | Bruce et al. | |
| 2002/0145258 A1 | 10/2002 | Nava et al. | |
| 2002/0192074 A1 | 12/2002 | Turnquist et al. | |
| 2002/0197155 A1 | 12/2002 | Howard et al. | |
| 2003/0132119 A1 * | 7/2003 | Ohara | F01D 11/12 205/109 |
| 2003/0183529 A1 * | 10/2003 | Ohara | C23C 6/00 205/109 |
| 2003/0203224 A1 * | 10/2003 | DiConza | C23C 4/02 428/472 |
| 2003/0211354 A1 | 11/2003 | Subramanian et al. | |
| 2003/0228483 A1 | 12/2003 | Fiala et al. | |
| 2004/0067317 A1 | 4/2004 | Gorman | |
| 2004/0137259 A1 * | 7/2004 | Pabla | C23C 4/02 428/650 |
| 2004/0142196 A1 | 7/2004 | Hajmrle et al. | |
| 2004/0208749 A1 * | 10/2004 | Torigoe | C23C 10/02 416/241 R |
| 2005/0196271 A1 | 9/2005 | Wilson et al. | |
| 2005/0281668 A1 | 12/2005 | Nava et al. | |
| 2006/0110248 A1 | 5/2006 | Nelson et al. | |
| 2006/0127223 A1 | 6/2006 | Nakahama et al. | |
| 2006/0285972 A1 | 12/2006 | Nicoll et al. | |
| 2008/0044278 A1 | 2/2008 | Paprotna et al. | |
| 2008/0081172 A1 | 4/2008 | Strock | |
| 2008/0107920 A1 * | 5/2008 | Rowe | F01D 5/288 428/701 |
| 2008/0124479 A1 | 5/2008 | Hazel et al. | |
| 2008/0124548 A1 | 5/2008 | Sporer et al. | |
| 2008/0219835 A1 | 9/2008 | Freling et al. | |
| 2010/0050408 A1 | 3/2010 | Minor et al. | |
| 2010/0150730 A1 | 6/2010 | Sellars et al. | |
| 2010/0151183 A1 | 6/2010 | Davis et al. | |
| 2010/0173094 A1 * | 7/2010 | Manier | C23C 24/10 427/543 |
| 2010/0266392 A1 | 10/2010 | Parkos, Jr. et al. | |
| 2010/0284797 A1 | 11/2010 | Jarrabet et al. | |
| 2011/0002779 A1 | 1/2011 | Schuster | |
| 2011/0014035 A1 | 1/2011 | Kojima et al. | |
| 2011/0027573 A1 | 2/2011 | Strock et al. | |
| 2011/0102968 A1 | 5/2011 | Choi et al. | |
| 2011/0103940 A1 | 5/2011 | Duval et al. | |
| 2011/0164963 A1 | 7/2011 | Taylor | |
| 2011/0182720 A1 | 7/2011 | Kojima et al. | |
| 2011/0206533 A1 | 8/2011 | Lee et al. | |
| 2011/0217484 A1 | 9/2011 | Lubcke et al. | |
| 2011/0243714 A1 | 10/2011 | Saxer et al. | |
| 2012/0099971 A1 | 4/2012 | Bintz et al. | |

FOREIGN PATENT DOCUMENTS

| | | |
|---|---|---|
| EP | 1967699 A1 | 9/2008 |
| EP | 2196631 A2 | 6/2010 |
| EP | 2241648 A2 | 10/2010 |
| EP | 2444515 A2 | 4/2012 |
| EP | 2444593 A1 | 4/2012 |
| GB | 2226050 A | 6/1990 |
| GB | 2475850 A | 8/2001 |
| JP | 2006036632 A | 2/2006 |
| WO | 2011053448 A1 | 5/2001 |
| WO | 2011100311 A1 | 8/2001 |
| WO | 2010102609 A1 | 9/2010 |
| WO | 2011008211 A1 | 1/2011 |
| WO | 2011076549 A1 | 6/2011 |
| WO | 2011078962 A1 | 6/2011 |
| WO | 2011085376 A1 | 7/2011 |
| WO | 2011141017 A2 | 11/2011 |

\* cited by examiner

202/700

SEAL SYSTEMS FOR USE IN TURBOMACHINES AND METHODS OF FABRICATING THE SAME

BACKGROUND

The field of the invention relates generally to turbomachines and, more particularly, to turbomachine seal systems that include abrasive materials applied to a tip of an airfoil and high temperature resistant and erosion resistant materials applied to a static portion and methods of applying the same.

At least some known turbomachines are turbine engines that include at least one stationary assembly extending over at least one rotor assembly. The rotor assembly includes at least one row of circumferentially-spaced, rotatable, metallic turbine blades or buckets. Also, at least some known turbine engines are gas turbine engines that also include at least one row of circumferentially-spaced, rotatable, metallic compressor blades. The buckets and blades include metallic airfoils that extend radially outward from a platform to a metallic tip. Many of such metallic airfoils are fabricated from materials such as nickel (Ni) and cobalt (Co) alloys.

Some known stationary assemblies of turbine engines include surfaces that form metallic shrouds that may be routinely exposed to a hot gas flux. Some of such metallic surfaces include an applied metallic-based MCrAlY coating and/or an applied ceramic thermal barrier coating (TBC) that forms a shroud over the stationary assembly. Alternatively, some such metallic surfaces include applied ceramic matrix composites (CMC) with, or without, a protective thermal barrier coating.

The metallic tips and the metallic shrouds define a tip clearance therebetween. However, such turbine engines that include both metallic shrouds and metallic buckets are configured with tip clearances that are sufficiently large enough to facilitate rub-free engine operation through the range of available engine operating conditions. However, such tip clearances are only suitable for low-temperature and low-efficiency turbine engines and would not be suitable for higher-temperature units that need higher efficiencies.

Some of the other known turbine engines include abradable shrouds formed over the stationary assembly. Typically, such shrouds are formed with a patterned abradable thermal barrier coating (TBC), including a dense vertical cracking (DVC) form of TBC. The tips are not coated and they abrade the shrouds as the rotor assembly rotates within the stationary assembly because the hardness value of the tips is greater than the hardness value of the shroud coating. Subsequently, the abradable shrouds and the tips define a tip clearance therebetween. The relatively less hard abradable TBC shroud coatings decrease a potential for damage to the relatively harder bucket/blade. However, because of the relative softness, such shroud coatings are prone to material loss to due to particulate erosion, especially along the patterned-contours. To counter particulate erosion, some turbine engines include more sturdy erosion resistant DVC-TBCs that are abraded by the metallic buckets/blades. However, due to the increased hardness, such DVC-TBC coated shrouds facilitate increased bucket/blade tip wear during rubbing, and have shown the tendency to spall due to rub-induced temperature rises.

Some of the remaining known turbine engines include similar abradable TBC shroud coatings formed over the stationary assembly and the bucket/blade tips include an abrasive material formed thereon that has a greater hardness value than the bucket/blade material and the abradable coating. The abrasive material abrades the shroud coatings as the rotor assembly rotates within the stationary assembly. The abradable shroud coatings and the abrasive tips define a tip clearance therebetween. The tip clearance is small enough to facilitate reducing axial flow through the turbine engine that bypasses the blades and buckets, thereby facilitating increased efficiency and performance of the turbine engine. The tip clearance is also large enough to facilitate rub-free engine operation through the range of available engine operating conditions. Moreover, as described above, many such TBC materials are erosion-resistant DVC-TBCs and have shown the tendency to spall due to rub-induced temperature rises.

In addition, some of those known turbine engines that include abradable TBC shrouds and an abrasive material formed on the buckets/blades use either silicon carbide (SiC) or cubic boron nitride (cBN) for the abrasive material due to their hardness characteristics. However, for temperatures above approximately 927 degrees Celsius (° C.) (1700 degrees Fahrenheit (° F.)), cBN becomes unstable and is prone to oxidation. Also, while SiC is better suited to survive temperatures in excess of approximately 927° C. (1700° F.), SiC abrasives include free silicon that may attack the Ni/Co alloy substrates.

BRIEF DESCRIPTION

In one aspect, a seal system is provided. The seal system is for an apparatus that includes a rotatable portion with airfoils coupled thereto and a stationary portion with an inner surface. The seal system includes an abradable portion including at least one abradable layer of an abradable material formed over the inner surface. The seal system also includes an abrading portion disposed over at least a portion of a substrate of the airfoil. The abrading portion includes at least one abrading layer formed on at least a portion of the substrate and a plurality of abrasive particles embedded within the abrading layer. The plurality of abrasive particles may include substantially all of one of tantalum carbide (TaC), aluminum oxide ($Al_2O_3$), or ziconia ($ZrO_2$). Also, the plurality of abrasive particles may include cubic boron nitride (cBN) and $Al_2O_3$ in predetermined ratios. Further, the plurality of abrasive particles may include cBN, $Al_2O_3$ and $ZrO_2$ in predetermined ratios. Moreover, the plurality of abrasive particles may include $Al_2O_3$ and $ZrO_2$ fused together in predetermined ratios. Also, the plurality of abrasive particles may include TaC and $Al_2O_3$ in predetermined ratios.

In a further aspect, a method of assembling a seal system for an apparatus includes providing a rotatable portion. The rotatable portion includes at least one airfoil assembly coupled thereto and the at least one airfoil assembly includes a substrate. The method includes extending a stationary portion over the at least a portion of the rotatable portion. The stationary portion includes an inner surface. The method also includes forming at least one layer of abradable material on at least a portion of the inner surface. The method further includes forming at least one matrix layer on at least a portion of the substrate. The at least one matrix layer includes a plurality of abrasive particles embedded within the at least one matrix layer. The plurality of abrasive particles may include substantially all of one of tantalum carbide (TaC), aluminum oxide ($Al_2O_3$), or ziconia ($ZrO_2$). Also, the plurality of abrasive particles may include cubic boron nitride (cBN) and $Al_2O_3$ in predetermined ratios. Further, the plurality of abrasive particles may include cBN, $Al_2O_3$ and $ZrO_2$ in predetermined ratios. Moreover, the plurality of abrasive particles may include $Al_2O_3$ and $ZrO_2$ fused together in predetermined ratios. Also, the plurality of abrasive particles may include TaC and $Al_2O_3$ in predetermined ratios.

In another aspect, a method of operating an apparatus that includes a rotatable portion and a stationary portion extending over at least a portion of the rotatable portion is provided. The stationary portion includes an inner surface and the rotatable portion includes at least one airfoil assembly coupled thereto. The method includes inducing a rotation in the rotatable member such that an abrading portion of a seal system rubs against an abradable portion of the seal system. The abradable portion includes at least one layer of at least one of dense vertically-cracked (DVC) yttria-stabilized zirconia (YSZ) and dense vertically-cracked (DVC) dysprosia-stabilized zirconia (DySZ) formed on the stationary portion. The abradable portion has a first hardness value. The abrading portion includes a plurality of abrasive particles embedded within at least one matrix layer. The plurality of abrasive particles has a second hardness value that is greater than the first hardness value. The plurality of abrasive particles may include substantially all of one of tantalum carbide (TaC), aluminum oxide ($Al_2O_3$), or zirconia ($ZrO_2$). Also, the plurality of abrasive particles may include cubic boron nitride (cBN) and $Al_2O_3$ in predetermined ratios. Further, the plurality of abrasive particles may include cBN, $Al_2O_3$ and $ZrO_2$ in predetermined ratios. Moreover, the plurality of abrasive particles may include $Al_2O_3$ and $ZrO_2$ fused together in predetermined ratios. Also, the plurality of abrasive particles may include TaC and $Al_2O_3$ in predetermined ratios. The method also includes removing at least a portion of the abradable portion with the abrading portion.

DRAWINGS

These and other features, aspects, and advantages of the present invention will become better understood when the following detailed description is read with reference to the accompanying drawings in which like characters represent like parts throughout the drawings, wherein.

Unless otherwise indicated, the drawings provided herein are meant to illustrate key inventive features of the invention. These key inventive features are believed to be applicable in a wide variety of systems comprising one or more embodiments of the invention. As such, the drawings are not meant to include all conventional features known by those of ordinary skill in the art to be required for the practice of the invention.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Figure 1:
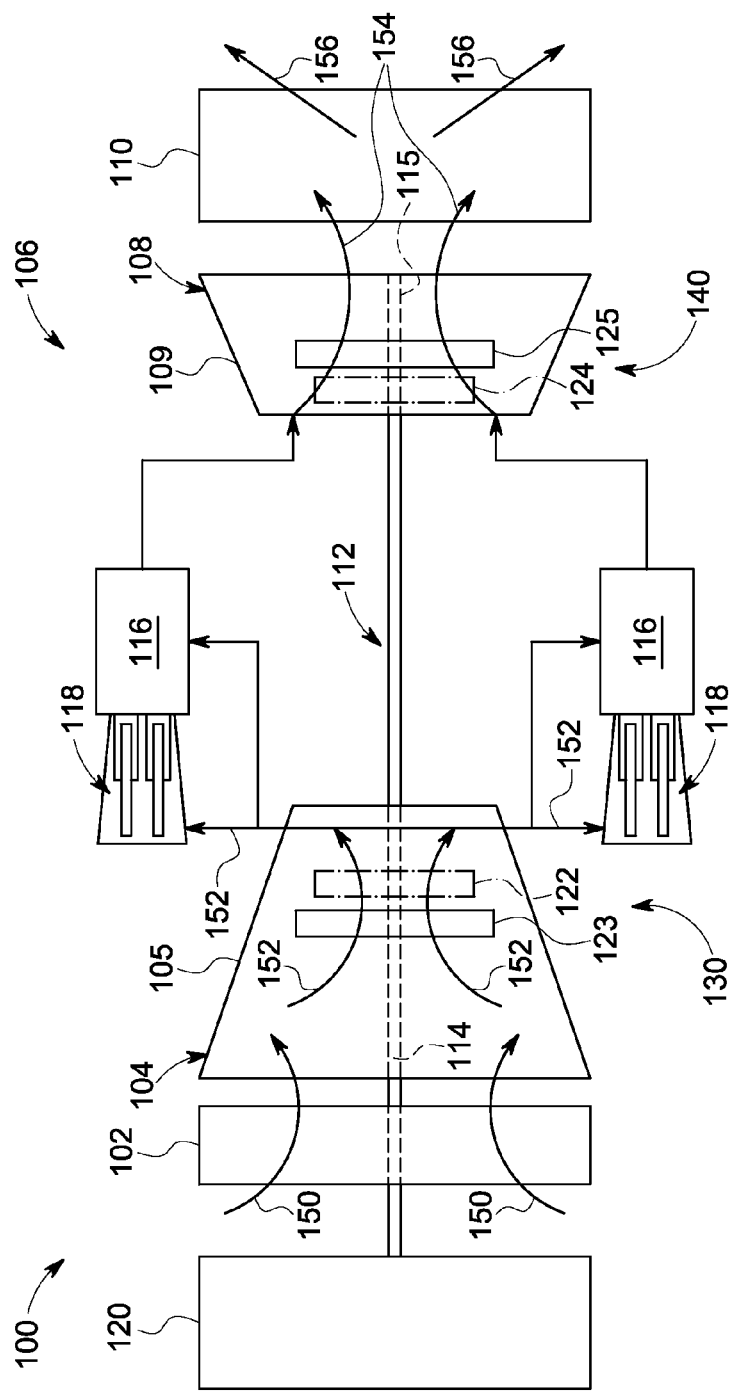
FIG. 1 is schematic diagram of an exemplary gas turbine engine.

FIG. 1 is a schematic view of a rotary machine. i.e., a turbomachine, and more specifically, a turbine engine. In the exemplary embodiment, the turbine engine is a gas turbine engine 100. Alternatively, the rotary machine is any other turbine engine and/or rotary machine, including, without limitation, a steam turbine engine, a centrifugal compressor, and a turbocharger. In the exemplary embodiment, gas turbine engine 100 includes an air intake section 102, and a compressor section 104 that is coupled downstream from, and in flow communication with, intake section 102. Compressor section 104 is enclosed within a compressor casing 105. A combustor section 106 is coupled downstream from, and in flow communication with, compressor section 104, and a turbine section 108 is coupled downstream from, and in flow communication with, combustor section 106. Turbine engine 108 is enclosed within a turbine casing 109 and includes an exhaust section 110 that is downstream from turbine section 108. Moreover, in the exemplary embodiment, turbine section 108 is coupled to compressor section 104 via a rotor assembly 112 that includes, without limitation, a compressor rotor, or drive shaft 114 and a turbine rotor, or drive shaft 115.

In the exemplary embodiment, combustor section 106 includes a plurality of combustor assemblies, i.e., combustors 116 that are each coupled in flow communication with compressor section 104. Combustor section 106 also includes at least one fuel nozzle assembly 118. Each combustor 116 is in flow communication with at least one fuel nozzle assembly 118. Moreover, in the exemplary embodiment, turbine section 108 and compressor section 104 are rotatably coupled to a load 120 via drive shaft 114. For example, load 120 may include, without limitation, an electrical generator and/or a mechanical drive application, e.g., a pump. Alternatively, gas turbine engine 100 may be an aircraft engine.

Also, in the exemplary embodiment, compressor section 104 includes at least one compressor blade assembly 122 and at least one adjacent stationary vane assembly 123. Each combination of compressor blade assembly 122 and adjacent stationary vane assembly 123 defines a compressor stage 130. Also, each compressor blade assembly 122 includes a plurality of compressor blades (not shown in FIG. 1) and each stationary vane assembly 123 includes a plurality of compressor vanes (not shown in FIG. 1). Furthermore, each compressor blade assembly 122 is removably coupled to compressor drive shaft 114 and each stationary vane assembly 123 is removably coupled to, and supported by, compressor casing 105.

Further, in the exemplary embodiment, turbine section 108 includes at least one turbine blade, i.e., bucket assembly 124 and at least one adjacent stationary nozzle assembly 125. Each combination of turbine bucket assembly 124 and adjacent stationary nozzle assembly 125 defines a turbine stage 140. Also, each turbine bucket assembly 124 includes a plurality of turbine buckets (not shown in FIG. 1) and each stationary nozzle assembly 125 includes a plurality of turbine nozzles (not shown in FIG. 1). Furthermore, each turbine bucket assembly 124 is removably coupled to turbine drive shaft 115 and each stationary nozzle assembly 125 is removably coupled to, and supported by, turbine casing 109.

In operation, air intake section 102 channels air 150 towards compressor section 104. Compressor section 104 compresses inlet air 150 to higher pressures and temperatures prior to discharging compressed air 152 towards combustor section 106. Compressed air 152 is channeled to fuel nozzle assembly 118, mixed with fuel (not shown), and burned within each combustor 116 to generate combustion gases 154 that are channeled downstream towards turbine section 108. Combustion gases 154 generated within combustors 116 are channeled downstream towards turbine section 108. After impinging turbine bucket assembly 124, thermal energy is converted to mechanical rotational energy that is used to drive rotor assembly 112. Turbine section 108 drives compressor section 104 and/or load 120 via drive shafts 114 and 115, and exhaust gases 156 are discharged through exhaust section 110 to ambient atmosphere.

Figure 2:
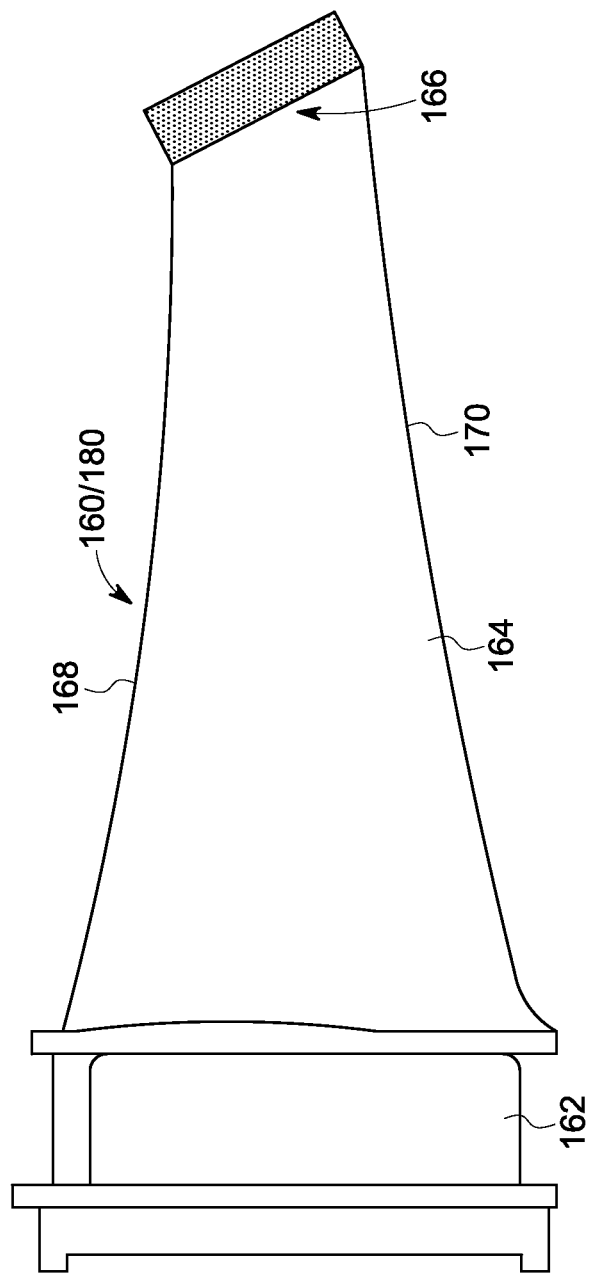
FIG. 2 is a schematic view of an exemplary turbine bucket that may be used with the gas turbine engine shown in FIG. 1.

FIG. 2 is a schematic view of an exemplary turbine bucket 160 that may be used with gas turbine engine 100 (shown in FIG. 1). Turbine bucket 160 includes a root portion 162 and an airfoil portion 164 coupled to root portion 162. Airfoil portion 164 defines an airfoil tip portion 166, a leading edge 168, and a trailing edge 170. Each turbine bucket 160 is removably coupled to turbine drive shaft 115 of rotor assembly 112 (both shown in FIG. 1) through a dovetail system (not shown). A similar arrangement and configuration may be used for each compressor blade 180 that is removably coupled to compressor drive shaft 114 (shown in FIG. 1).

Figure 3:
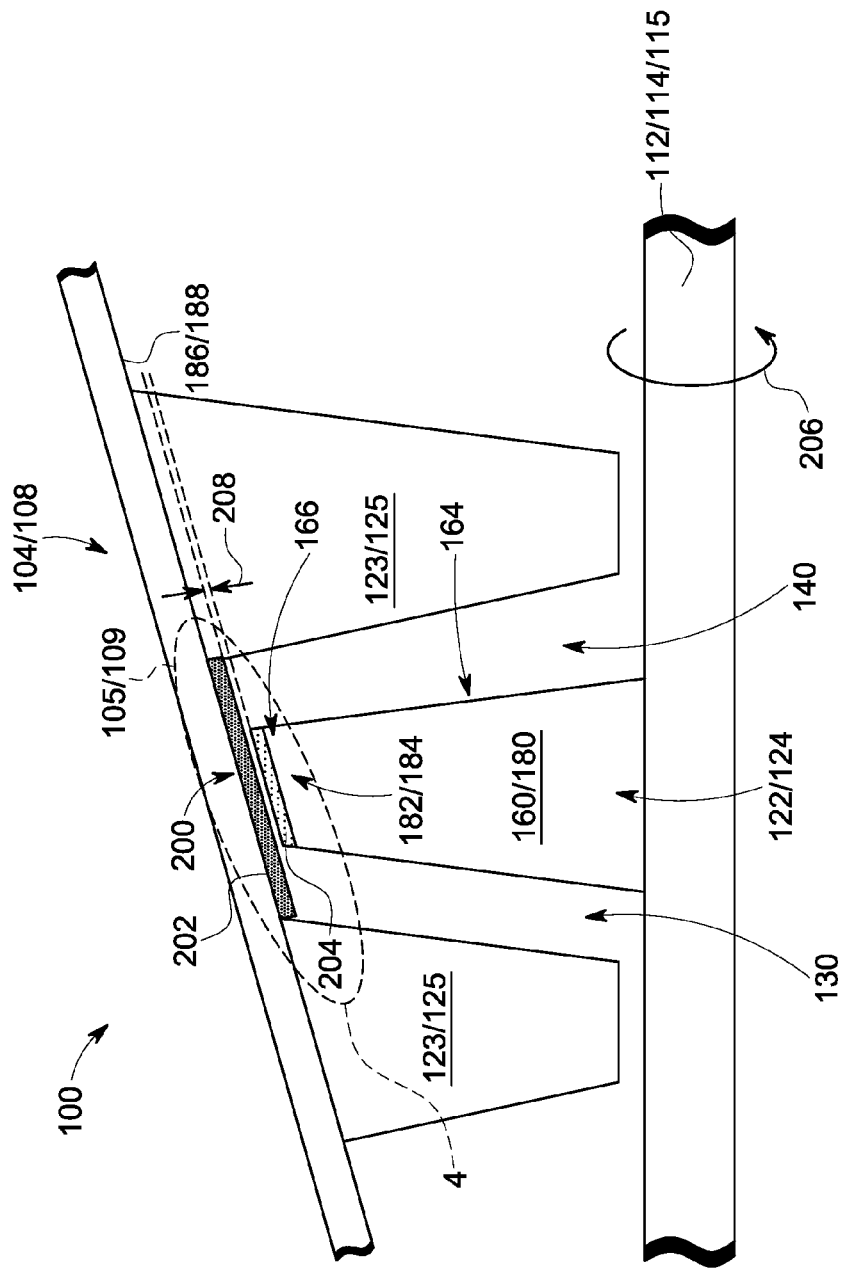
FIG. 3 is a schematic view of an exemplary seal system that may be used with the gas turbine engine shown in FIG. 1.

FIG. 3 is a schematic view of an exemplary seal system 200 that may be used with gas turbine engine 100. Seal system 200 may be used with compressor section 104 and turbine section 108. Gas turbine engine 100 includes a plurality of compressor stages 130 and a plurality of turbine stages 140. Each compressor stage 130 includes a plurality of compressor blades 180 and each turbine stage 140 includes a plurality of turbine buckets 160. Each compressor blade 180 includes an airfoil tip substrate 182 and each turbine bucket 160 includes an airfoil tip substrate 184. Airfoil tip substrates 182 and 184 are formed from one of a nickel (Ni)-based alloy and a cobalt (Co)-based alloy. Alternatively, airfoil tip substrates 182 and 184 are formed from any materials that enable operation of gas turbine engine 100 and seal system 200 as described herein. Compressor casing 105 includes an inner surface 186 and turbine casing 109 includes an inner surface 188.

In the exemplary embodiment, and focusing on turbine section 108, seal system 200 includes an abradable portion, i.e., shroud 202 formed over inner surface 188. Alternatively, shroud 202 may be formed over a standard statoric bond coat. Abradable shroud 202 has a first hardness value. Seal system 200 also includes an abrading portion 204 disposed over airfoil tip substrate 184. Abrading portion 204 has a second hardness value that is greater than the first hardness value. In operation of gas turbine engine 100, a rotational motion 206 is induced in turbine drive shaft 115 such that abrading portion 204 rubs against abradable shroud 202 and a clearance gap 208 is defined between abrading portion 204 formed on airfoil tip portion 166 and abradable shroud 202 formed on turbine casing 109. Abradable shroud 202 is rubbed to define one of a substantially smoothed surface and a patterned surface (neither shown). Alternatively, the substantially smoothed surface and/or patterned surface may be formed during manufacture of abradable shroud 202 (discussed further below). Clearance gap 208 has a predetermined range of values that facilitates reducing a flow of working fluid (not shown in FIG. 3) between turbine bucket 160 and turbine casing 109, thereby increasing an efficiency of gas turbine engine 100, while also reducing rubbing of turbine bucket 160 with turbine casing 109, thereby increasing a useful life expectancy of turbine buckets 160. Alternatively, rather than forming abradable shroud 202 directly on surface 188, a first layer of a high-temperature material is formed on surface 188. Such first layer may be formed from materials that include, without limitation, a chromium-aluminum-yttrium alloy (MCrAlY), where M includes at least one of nickel (Ni), cobalt (Co), and iron (Fe) in any combination. Subsequently, abradable shroud 202 is formed over the first layer.

Figure 4:
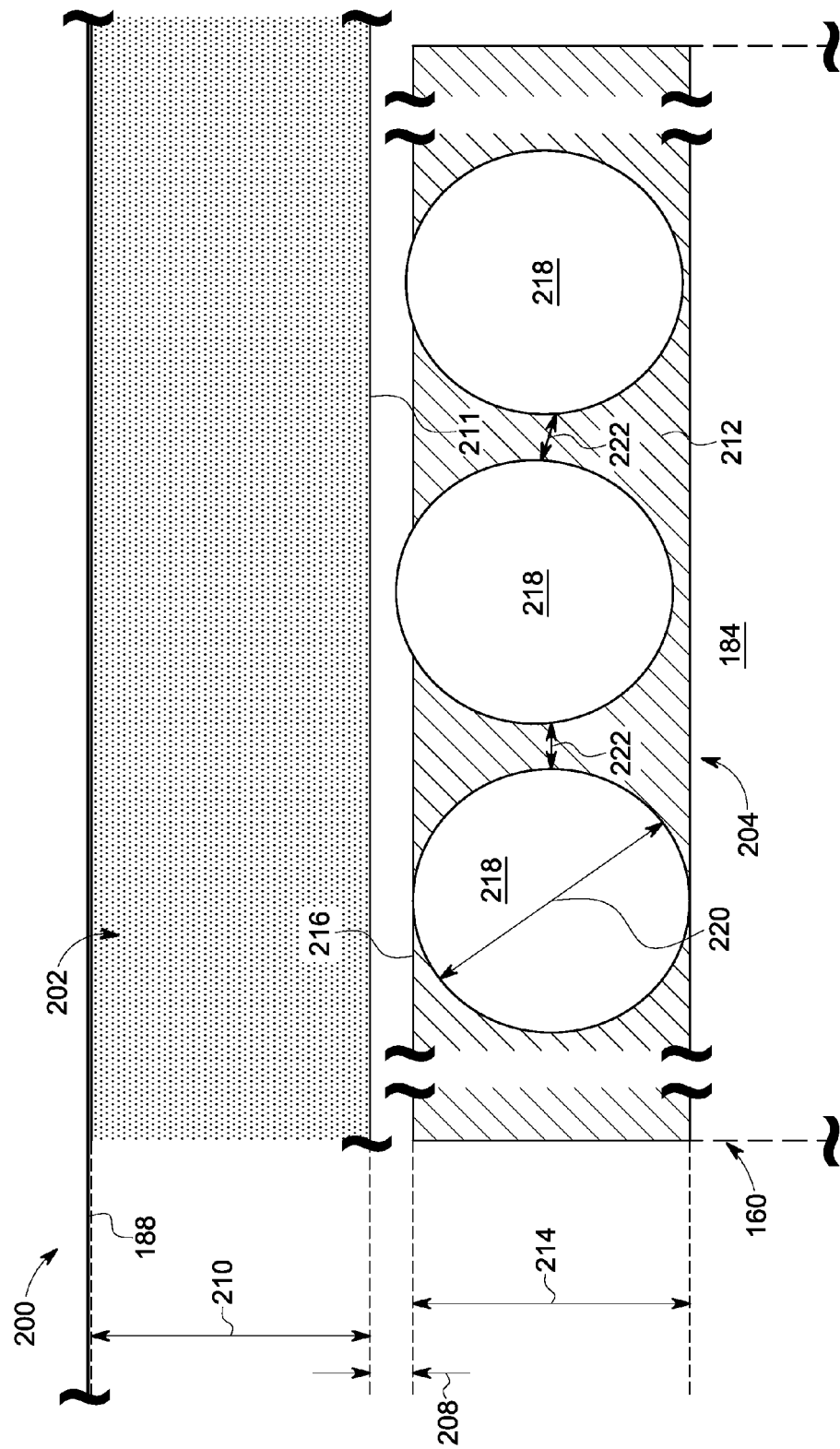
FIG. 4 is an enlarged schematic view of the exemplary seal system shown in FIG. 3.

FIG. 4 is an enlarged schematic view of exemplary seal system 200 taken along area 4 (shown in FIG. 3). The objects in FIG. 4 are not shown to scale. In the exemplary embodiment, and focusing on turbine section 108 (shown in FIGS. 1 and 3), seal system 200 includes abradable shroud 202 formed over inner surface 188. In some embodiments, abradable shroud 202 is formed from dense vertically-cracked (DVC) yttria-stabilized zirconia (YSZ) having a porosity value of less than 5%. Alternatively, in other embodiments, abradable shroud 202 is formed from DVC dysprosia-stabilized zirconia (DySZ) having a porosity value of less than 5%. Also, alternatively, abradable shroud 202 is formed from one of standard YSZ and DySZ with porosities less than 35%, and preferably less than 25%.

In the exemplary embodiment, abradable shroud 202 extends from inner surface 188 toward turbine bucket 160 and has a thickness 210 of at least approximately 500 microns (μ) (20 mils, i.e., 0.020 inches)) and has a surface face 211. Alternatively, abradable shroud 202 has any thickness value 210 that enables operation of seal system 200 as described herein. Also, in the exemplary embodiment, abradable shroud 202 is formed by spraying at least one layer (not shown) of either DVC YSZ or DVC DySZ on inner surface 188. Abradable shroud 202 has a range of Vickers hardness ($HV_{0.3}$) values between approximately 400 and approximately 1200.

Seal system 200 also includes abrading portion 204 disposed over airfoil tip substrate 184. In the exemplary embodiment, abrading portion 204 includes at least one abrading matrix layer 212 having a thickness 214 within a range between approximately 50.8μ (2 mils) and approximately 500μ (20 mils). Abrading matrix layer 212 defines an abrading matrix layer surface 216. Abrading portion 204 may be formed directly on airfoil tip substrate 184 or formed on layers of a standard airfoil bond coat.

Also, in the exemplary embodiment, abrading matrix layer 212 includes a single matrix layer formed from one of metallic materials and ceramic materials. Alternatively, abrading matrix layer 212 includes any number of layers that enables operation of gas turbine engine 100 and seal system 200 as described herein. In some embodiments, the metallic matrix materials may be MCrAlY. In other embodiments, the metallic matrix materials may be a chromium-aluminum alloy (MCrAlX), where M includes at least one of nickel (Ni), cobalt (Co), and iron (Fe) in any combination, and X includes at least one of hafnium (Hf), Y, Si, and tantalum (Ta) in any combination. Further, in the exemplary embodiment, abrading matrix layer 212 is formed by forming either a MCrAlY matrix layer or a MCrAlX matrix layer through an electrolytic process. In some other embodiments, abrading matrix layer 212 may be formed from metallic materials that may include alloys including at least two of Ni, aluminum (Al), and platinum (Pt) in any combination through an electrolytic process. Alternatively, the metallic matrix materials may be any metallic materials formed on airfoil tip substrate 184 by any methods that enable operation of gas turbine engine 100 and seal system 200 as described herein. Metallic abrading matrix layer 212 has a range of Vickers hardness values between approximately 400 and approximately 1200.

Moreover, in some embodiments, abrading matrix layer 212 is formed from ceramic materials that include at least one of yttria-stabilized zirconia (YSZ), zirconia-toughened alumina, alumina-toughened zirconia, $Al_2O_3$, and hafnia ($HfO_2$). Such ceramic-based abrading matrix layer 212 may be formed by mixing at least one of Si, titanium (Ti), tungsten (W), boron (B) and zirconium (Zr) with at least one of nickel chrome (NiCr) and Ni to form a braze matrix. Alternatively, the ceramic matrix materials may be any ceramic materials formed on airfoil tip substrate 184 by any methods that enable operation of gas turbine engine 100 and seal system 200 as described herein. Ceramic abrading matrix layer 212 has a range of Vickers hardness values between approximately 400 and approximately 1200.

Also, in the exemplary embodiment, abrading portion 204 includes a plurality of abrasive particles 218 embedded within abrading matrix layer 212. Abrasive particles 218 may include substantially all of one of tantalum carbide (TaC), aluminum oxide ($Al_2O_3$), or ziconia ($ZrO_2$). Also, abrasive particles 218 may include cubic boron nitride (cBN) and $Al_2O_3$ in predetermined ratios. Further, abrasive particles 218 may include may include cBN, $Al_2O_3$ and $ZrO_2$ in predetermined ratios. Moreover, abrasive particles 218 may include $Al_2O_3$ and $ZrO_2$ fused together in predetermined ratios. Also, abrasive particles 218 may include TaC and $Al_2O_3$ in predetermined ratios. Further, abrasive particles 218 may include polycrystalline alumina (sol-gel).

Abrasive particles 218 have a range of Vickers hardness values between approximately 1000 and approximately 4800. The hardness values of abrasive particles 218 are greater than the hardness values of abrading matrix layer 212, which in turn are greater than the hardness values of abradable shroud 202.

Further, in the exemplary embodiment, abrasive particles 218 are sized to have an equivalent diameter 220 within a range between approximately 50.8μ (2 mils) and approximately 500μ (20 mils). Also, abrasive particles 218 as embedded within abrading matrix layer 212 are separated from each other with an equivalent spacing 222 ranging between approximately 20μ (less than one mil) and approximately 500μ (20 mils). Abrasive particles 218 are shown as substantially spherical. However, abrasive particles 218 may have any shape and configuration that enables operation of gas turbine engine 100 and seal system 200 as described herein, including, without limitation, multi-faceted.

Alternatively, abrading matrix layer 212 is formed through a two-stage process. The first stage includes forming a brazing compound (not shown) that includes mixing at least one of Si, Ti, W, B, and Zr with at least one of NiCr and Ni. The first stage also includes applying the brazing compound to substrate 184. The first stage further includes brazing a plurality of abrasive particles 218 to substrate 184. The second stage includes forming an electrolytic compound (not shown) that includes forming a MCrAlY matrix compound (not shown). The second stage also includes applying the electrolytic compound to abrasive particles 218 brazed to substrate 184 and filling in at least a portion of the spacing therebetween with the MCrAlY matrix compound. The second stage further includes using electrolytic methods to finish forming abrading matrix layer 212 with embedded abrasive particles 218.

Abrading portion 204 has a hardness value that is greater than the hardness value of abradable shroud 202. In operation of gas turbine engine 100, a rotational motion 206 (shown in FIG. 3) is induced in turbine drive shaft 115 (shown in FIG. 3) such that abrading portion 204 rubs against abradable shroud 202 and clearance gap 208 is defined between abradable shroud 202 and abrading portion 204. As shown in FIG. 4, abrasive particles 218 may vary in position with respect to abrading matrix layer surface 216 radially, axially, and circumferentially. Therefore, abradable shroud 202 may be rubbed to define one of a substantially smoothed surface and a patterned surface (neither shown). Clearance gap 208 has a predetermined range of values that facilitates reducing a flow of working fluid (not shown in FIG. 4) between turbine bucket 160 and turbine casing 109 (both shown in FIG. 3), thereby increasing an efficiency of gas turbine engine 100, while also reducing rubbing of turbine bucket 160 with turbine casing 109, thereby increasing a useful life expectancy of turbine buckets 160.

Figure 5:
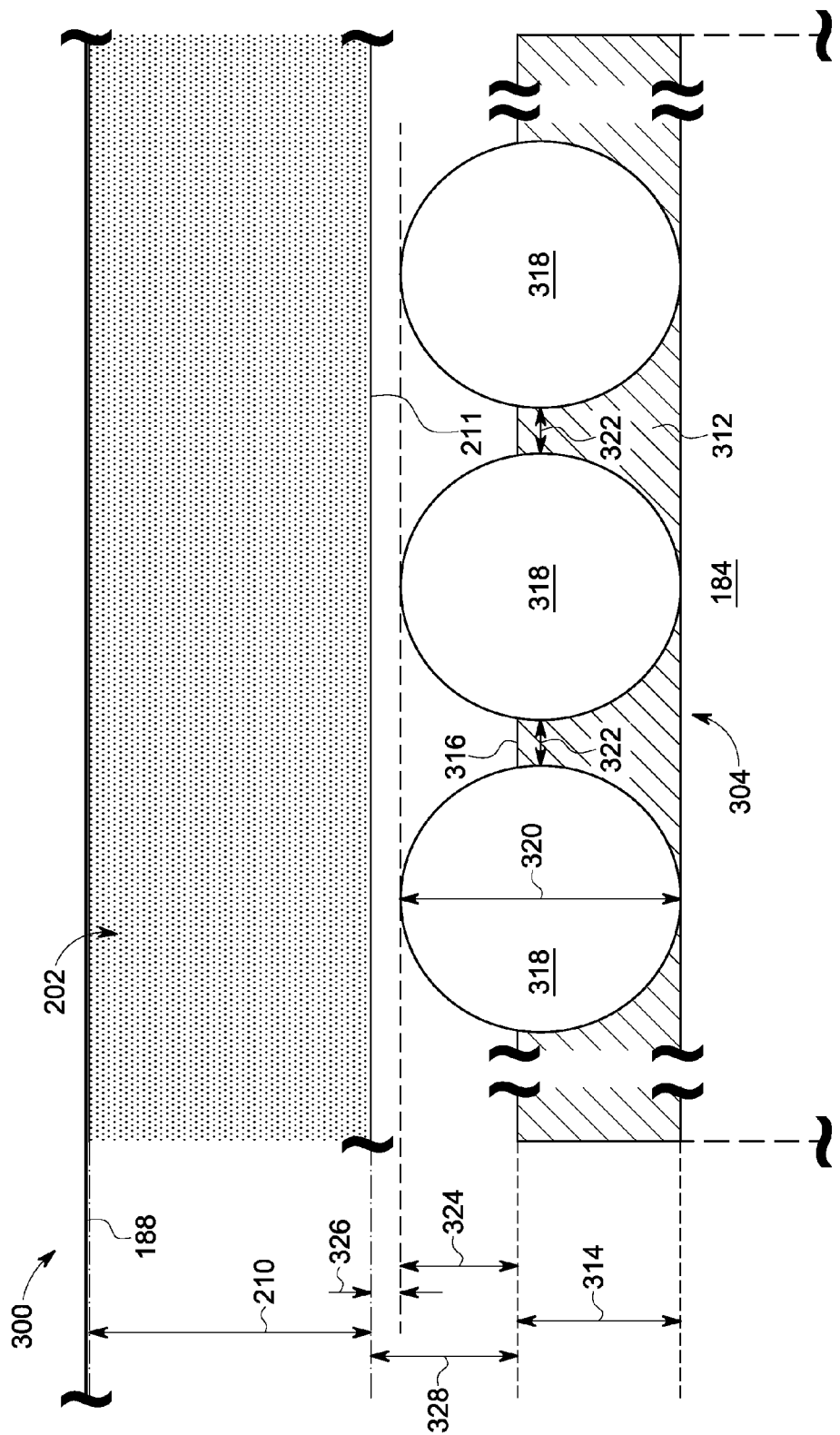
FIG. 5 is an enlarged schematic view of an alternative exemplary seal system that may be used with the gas turbine engine shown in FIG. 3.

FIG. 5 is an enlarged schematic view of an alternative exemplary seal system 300 that may be used with gas turbine engine 100 taken along area 4 (both shown in FIG. 3). The objects in FIG. 5 are not shown to scale. In the exemplary embodiment, and focusing on turbine section 108 (shown in FIGS. 1 and 3), seal system 300 includes abradable shroud 202 formed over inner surface 188. Abradable shroud 202 has surface face 211.

Seal system 300 also includes an alternative abrading portion 304 disposed over airfoil tip substrate 184. Abrading portion 304 may be formed directly on airfoil tip substrate 184 or formed on layers of a standard airfoil bond coat. In the exemplary embodiment, abrading portion 304 includes at least one abrading matrix layer 312 having a thickness 314 within a range between approximately 50.8μ (2 mils) and approximately 500μ (20 mils). Abrading matrix layer 312 defines an abrading matrix layer surface 316. Also, in the exemplary embodiment, abrading matrix layer 312 includes a single matrix layer formed from one of metallic materials and ceramic materials substantially similar to that described for abrading matrix layer 212 (shown in FIG. 4). Alternatively, abrading matrix layer 312 includes any number of layers that enables operation of gas turbine engine 100 and seal system 300 as described herein.

Further, in the exemplary embodiment, abrading portion 304 includes a plurality of abrasive particles 318 embedded within abrading matrix layer 312. Abrasive particles 318 are substantially similar to abrasive particles 218 (shown in FIG. 4) with respect to materials and size, i.e., abrasive particles 318 are sized to have an equivalent diameter 320 within a range between approximately 50.8μ (2 mils) and approximately 500μ (20 mils). Also, abrasive particles 318 as embedded within abrading matrix layer 312 are separated from each other with an equivalent spacing 322 ranging between approximately 20μ (less than one mil) and approximately 500μ (20 mils). Abrasive particles 318 are shown as substantially spherical. However, abrasive particles 318 may have any shape and configuration that enables operation of gas turbine engine 100 and seal system 300 as described herein, including, without limitation, multi-faceted.

In contrast to seal system 200, abrasive particles 318 are embedded within abrading matrix layer 312 such that at least a portion of abrasive particles 318 extend beyond abrading matrix layer surface 316 a distance 324. In the exemplary embodiment, distance 324 is within a range between approximately 0% and 40% of equivalent diameter 320. Abradable shroud 202 is rubbed to define a clearance gap 326 such that a distance 328 is defined between abrading matrix layer surface 316 and abradable surface face 211. Distance 328 is sized to facilitate reducing a potential of contact between abrading matrix layer 312 and abradable shroud 202. Clearance gap 326 has a predetermined range of values that facilitates reducing a flow of working fluid (not shown in FIG. 5) between turbine bucket 160 and turbine casing 109 (both shown in FIG. 3), thereby increasing an efficiency of gas turbine engine 100, while also reducing rubbing of turbine bucket 160 with turbine casing 109, thereby increasing a useful life expectancy of turbine buckets 160. Also, seal system 300 facilitates decreasing costs associated with forming a thinner layer of abrading matrix layer 312. Further, increasing distance 328 facilitates use of less dense abrading matrix layers 312.

Figure 6:
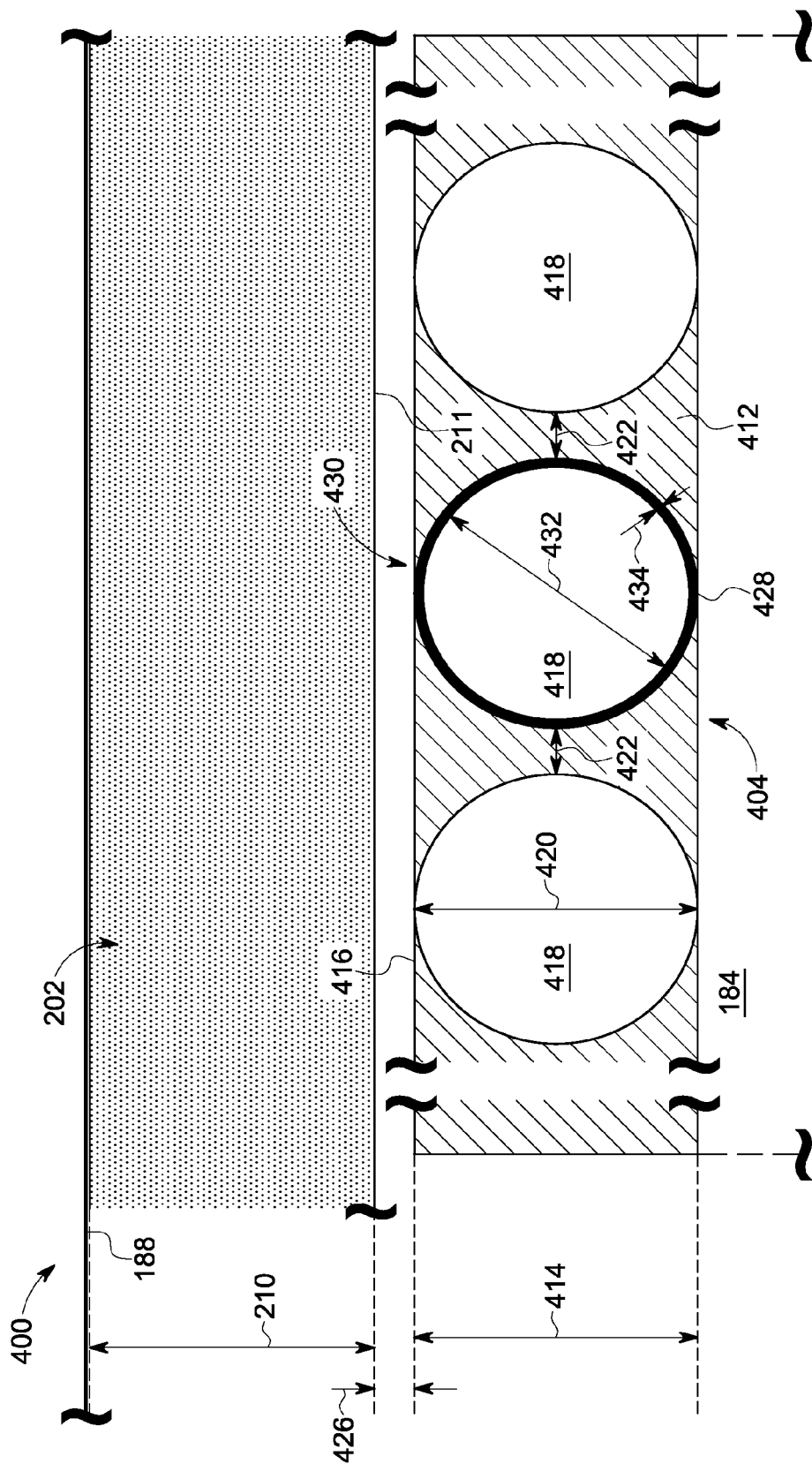
FIG. 6 is an enlarged schematic view of another alternative exemplary seal system that may be used with the gas turbine engine shown in FIG. 3.

FIG. 6 is an enlarged schematic view of another alternative exemplary seal system 400 that may be used with gas turbine engine 100 taken along area 4 (both shown in FIG. 3). The objects in FIG. 6 are not shown to scale. In the exemplary embodiment, and focusing on turbine section 108 (shown in FIGS. 1 and 3), seal system 400 includes abradable shroud 202 formed over inner surface 188. Abradable shroud 202 has surface face 211.

Seal system 400 also includes an alternative abrading portion 404 disposed over airfoil tip substrate 184. Abrading portion 404 may be formed directly on airfoil tip substrate 184 or formed on layers of a standard airfoil bond coat. In the exemplary embodiment, abrading portion 404 includes at least one abrading matrix layer 412 having a thickness 414 within a range between approximately 50.8μ (2 mils) and approximately 500μ (20 mils). Abrading matrix layer 412 defines an abrading matrix layer surface 416. Also, in the exemplary embodiment, abrading matrix layer 412 includes a single matrix layer formed from one of metallic materials and ceramic materials substantially similar to that described for abrading matrix layer 212 (shown in FIG. 4).

Further, in this alternative exemplary embodiment, abrading portion 404 includes a plurality of uncoated abrasive particles 418 embedded within abrading matrix layer 412. Uncoated abrasive particles 418 are substantially similar to abrasive particles 218 (shown in FIG. 4) with respect to materials and size, i.e., uncoated abrasive particles 418 are sized to have an equivalent diameter 420 within a range between approximately 50.8μ (2 mils) and approximately 500μ (20 mils). Also, uncoated abrasive particles 418 as embedded within abrading matrix layer 412 are separated from each other with an equivalent spacing 422 ranging between approximately 20μ (less than one mil) and approximately 500μ (20 mils). Uncoated abrasive particles 418 are shown as substantially spherical. However, uncoated abrasive particles 418 may have any shape and configuration that enables operation of gas turbine engine 100 and seal system 400 as described herein, including, without limitation, multi-faceted.

Moreover, in this alternative exemplary embodiment, at least a portion of the plurality of uncoated abrasive particles 418 are coated with at least one coating layer 428 to form a plurality of coated abrasive particles 430. Coated abrasive particles 430 include an uncoated abrasive particles 418 with an equivalent diameter 432 within a range between approximately 50.8μ (2 mils) and approximately 500μ (20 mils). Coated abrasive particles 430 also include coating layer 428 having a value of thickness 434 that ranges between approximately 0.5μ (0.02 mils) and approximately 20μ (0.8 mils). Coated abrasive particles 430 are shown with a sizing that includes equivalent diameter 432 and coating thickness 434 that is substantially equivalent to equivalent diameter 420. Alternatively, coated abrasive particles 430 include any sizing that enables operation of gas turbine engine 100 and seal system 400 as described herein. Also, seal system 400 includes any ratio of coated abrasive particles 430 to uncoated abrasive particles 418 that enables operation of gas turbine engine 100 and seal system 400 as described herein.

In this alternative exemplary embodiment, coated abrasive particles 430 include uncoated abrasive particles 418 that are formed from silicon carbide (SiC). Also, coating layer 428 is an external inert particle coating material including, without limitation, $Al_2O_3$ and mullite. Coating layer 428 facilitates decreasing a potential for chemical interaction between the SiC material of uncoated abrasive particles 418 and airfoil tip substrate 184.

Abradable shroud 202 is rubbed to define a clearance gap 426 between abrading matrix layer surface 416 and abradable surface face 211. Clearance gap 426 is sized to facilitate reducing a potential of contact between abrading matrix layer 412 and abradable shroud 202. Clearance gap 426 has a predetermined range of values that facilitates reducing a flow of working fluid (not shown in FIG. 6) between turbine bucket 160 and turbine casing 109 (both shown in FIG. 3), thereby increasing an efficiency of gas turbine engine 100, while also reducing rubbing of turbine bucket 160 with turbine casing 109, thereby increasing a useful life expectancy of turbine buckets 160.

Figure 7:
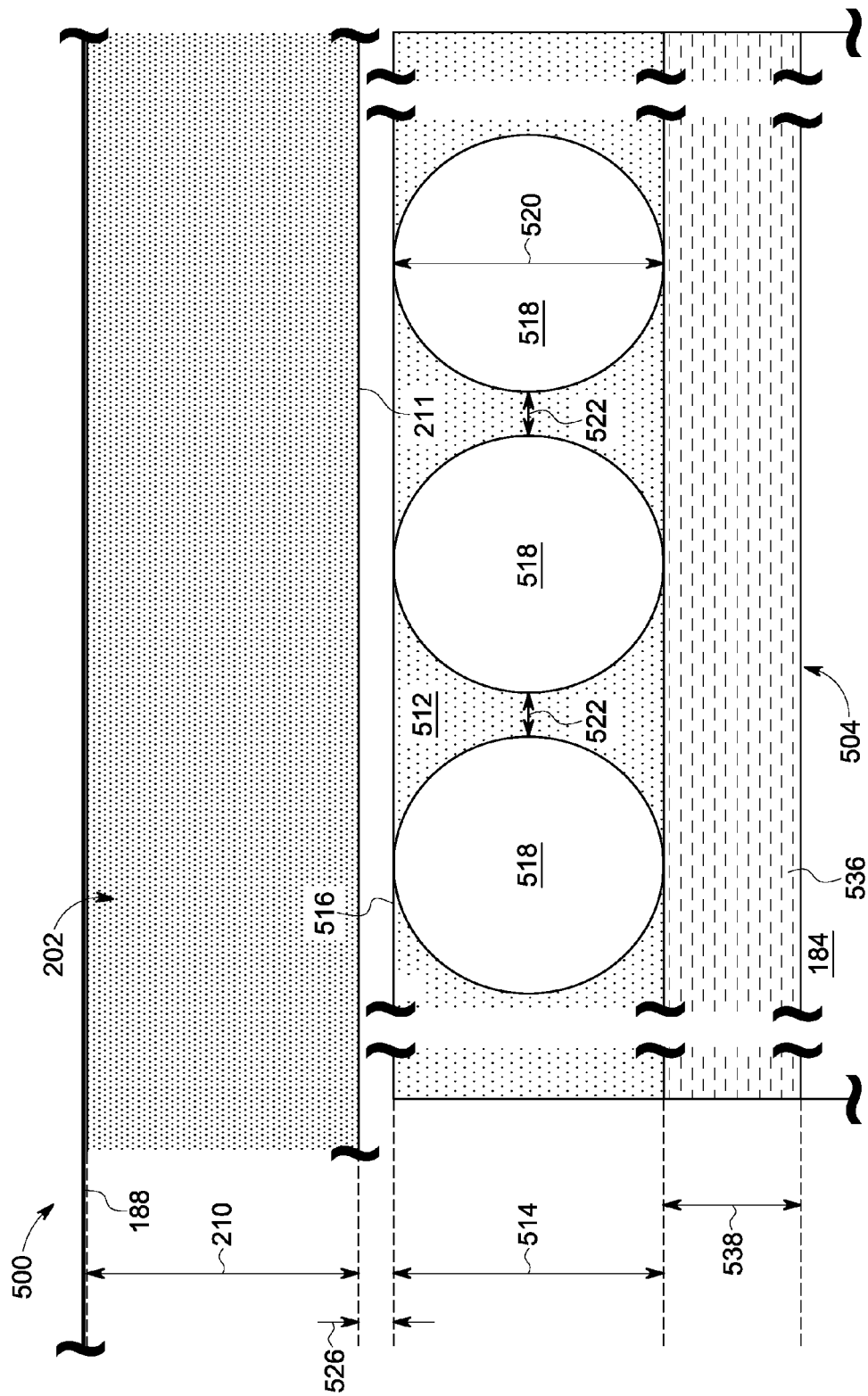
FIG. 7 is an enlarged schematic view of yet another alternative exemplary seal system that may be used with the gas turbine engine shown in FIG. 3.

FIG. 7 is an enlarged schematic view of yet another alternative exemplary seal system 500 that may be used with gas turbine engine 100 (shown in FIG. 3). The objects in FIG. 7 are not shown to scale. In the exemplary embodiment, and focusing on turbine section 108 (shown in FIGS.

1 and 3), seal system 500 includes abradable shroud 202 formed over inner surface 188. Abradable shroud 202 has surface face 211.

Seal system 500 also includes an alternative abrading portion 504 disposed over airfoil tip substrate 184. Abrading portion 504 may be formed directly on airfoil tip substrate 184 or formed on layers of a standard airfoil bond coat. In the exemplary embodiment, abrading portion 504 includes at least one abrading matrix layer 512 having a thickness 514 within a range between approximately 50.8μ (2 mils) and approximately 500μ (20 mils). Abrading matrix layer 512 defines an abrading matrix layer surface 516. Also, in the exemplary embodiment, abrading matrix layer 512 includes a single matrix layer formed from one of metallic materials and ceramic materials substantially similar to that described for abrading matrix layer 212 (shown in FIG. 4). Alternatively, abrading matrix layer 512 includes any number of layers that enables operation of gas turbine engine 100 and seal system 500 as described herein.

Further, in the exemplary embodiment, abrading portion 504 includes a plurality of abrasive particles 518 embedded within abrading matrix layer 512. Abrasive particles 518 are substantially similar to abrasive particles 218 (shown in FIG. 4) with respect to materials and size, i.e., abrasive particles 518 are sized to have an equivalent diameter 520 within a range between approximately 50.8μ (2 mils) and approximately 500μ (20 mils). Also, abrasive particles 518 as embedded within abrading matrix layer 512 are separated from each other with an equivalent spacing 522 ranging between approximately 20μ (less than one mil) and approximately 500μ (20 mils). Abrasive particles 518 are shown as substantially spherical. However, abrasive particles 518 may have any shape and configuration that enables operation of gas turbine engine 100 and seal system 500 as described herein, including, without limitation, multi-faceted.

Moreover, in this alternative exemplary embodiment, at least a portion of the plurality of abrasive particles 518 are formed from SiC. Therefore, to facilitate decreasing a potential for chemical interaction between the SiC material of abrasive particles 518 and airfoil tip substrate 184, abrading portion 504 includes an intermediate layer 536 formed between abrading matrix layer 512 and substrate 184. In this alternative exemplary embodiment, intermediate layer 536 is formed from ceramic materials that include at least one of yttria-stabilized zirconia (YSZ), zirconia-toughened alumina, alumina-toughened zirconia, $Al_2O_3$, and hafnia ($HfO_2$). Such ceramic-based intermediate layer 536 may be formed by mixing at least one of Si, Ti, W, B, and Zr with at least one of NiCr and Ni to form a braze matrix. Alternatively, the ceramic materials may be any ceramic materials formed on airfoil tip substrate 184 by any methods that enable operation of gas turbine engine 100 and seal system 500 as described herein. Also, alternatively, intermediate layer 536 may be formed from any materials, including, without limitation, metallic, and by any methods that enable operation of gas turbine engine 100 and seal system 500 as described herein. Intermediate layer 536 defines a layer thickness 538 that has any value that enables operation of gas turbine engine 100 and seal system 500 as described herein. In the exemplary embodiment, layer thickness 538 has a value between approximately 50.8μ (2 mils) and approximately 76.2μ (3 mils).

Abradable shroud 202 is rubbed to define a clearance gap 526 between abrading matrix layer surface 516 and abradable surface face 211. Clearance gap 526 is sized to facilitate reducing a potential of contact between abrading matrix layer 512 and abradable shroud 202. Clearance gap 526 has a predetermined range of values that facilitates reducing a flow of working fluid (not shown in FIG. 7) between turbine bucket 160 and turbine casing 109 (both shown in FIG. 3), thereby increasing an efficiency of gas turbine engine 100, while also reducing rubbing of turbine bucket 160 with turbine casing 109, thereby increasing a useful life expectancy of turbine buckets 160.

Figure 8:
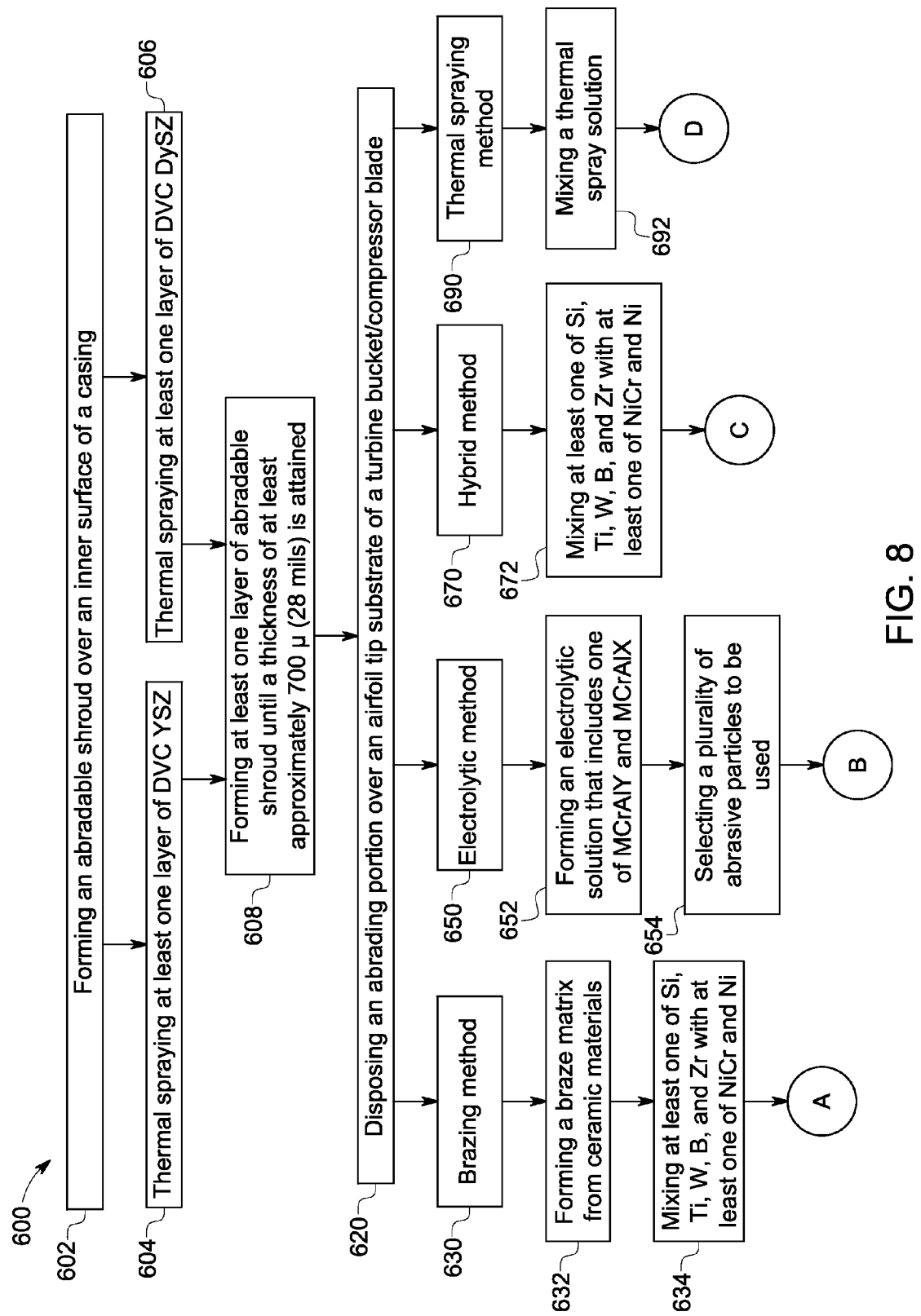
FIG. 8 is a flow chart of an exemplary method of assembling a seal system that may be used with the gas turbine engine shown in FIG. 3.
Figure 9:
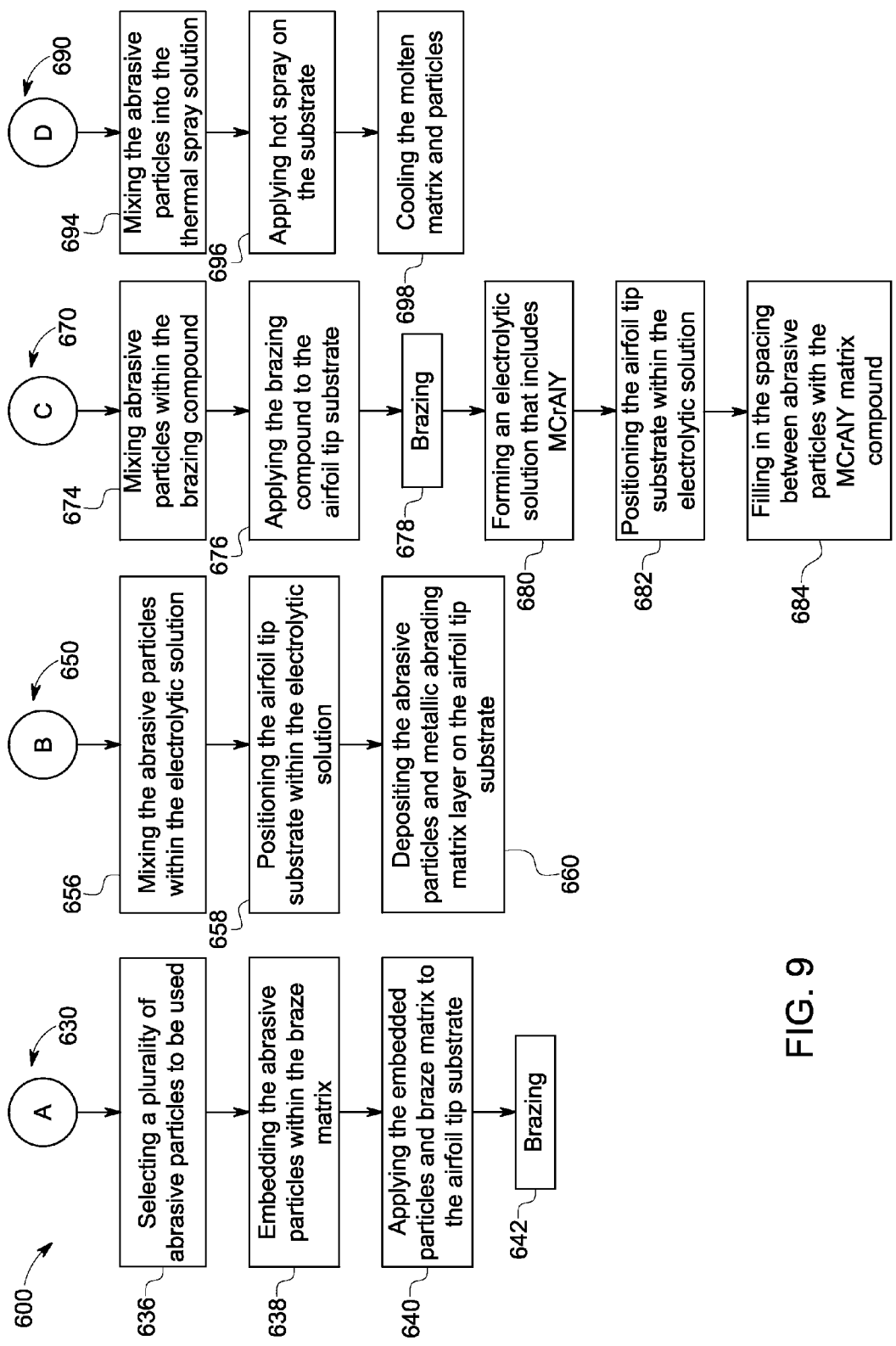
FIG. 9 is a continuation of the method of assembling a seal system in FIG. 8.

FIG. 8 is a flow chart of an exemplary method 600 of assembling seal system 200, 300, 400, and 500 (shown in FIGS. 4, 5, 6, and 7, respectively) that may be used with gas turbine engine 100 (shown in FIG. 3). FIG. 9 is a continuation of method 600.

In the exemplary embodiment, and focusing on turbine section 108 (shown in FIGS. 1 and 3), abradable shroud 202 (shown in FIGS. 3, 4, 5, 6, and 7) is formed 602 over inner surface 188 (shown in FIGS. 3, 4, 5, 6, and 7). In some embodiments, abradable shroud 202 is formed through thermal spraying 604 at least one layer of DVC YSZ having a porosity value of less than 5% on inner surface 188. Alternatively, in other embodiments, abradable shroud 202 is formed through thermal spraying 606 at least one layer of DVC DySZ having a porosity value of less than 5% on inner surface 188. Also, alternatively, either of a standard YSZ or DySZ may be used having a porosity value of less than 35%, and preferably less than 25%. The predetermined porosity values determine the abradable features of abradable shroud 202 for effective abrading by abrading portion 204 (shown in FIGS. 3, 4, 5, 6, and 7). The at least one layer of abradable shroud 202 is formed 608 until a thickness 210 (shown in FIGS. 3, 4, 5, 6, and 7) of at least approximately 700μ (28 mils) is attained with a surface face 211 (shown in FIGS. 3, 4, 5, 6, and 7). Alternatively, abradable shroud 202 has any thickness value 210 that enables operation of seal system 200 as described herein. Abradable shroud 202 has a predetermined range of Vickers hardness values between approximately 400 and approximately 1200.

Also, in the exemplary embodiment, abrading portion 204, 304, 404, and 504 is disposed 620 over airfoil tip substrate 184 (both shown in FIGS. 3, 4, 5, 6, and 7) of turbine bucket 160 (shown in FIG. 3).

In some embodiments, a brazing method 630 is used to facilitate disposing 620 abrading portion 204, 304, 404, and 504 over airfoil tip substrate 184. Brazing method 630 includes forming 632 a braze matrix from ceramic materials that include at least one of YSZ, zirconia-toughened alumina, alumina-toughened zirconia, $Al_2O_3$, and $HfO_2$. Also, brazing method 630 includes mixing 634 at least one of Si, Ti, W, B, and Zr with at least one of NiCr and Ni to facilitate forming 632 the braze matrix. Alternatively, the ceramic matrix materials may be any ceramic materials formed on airfoil tip substrate 184 that enable operation of gas turbine engine 100 and seal systems 200, 300, 400, and 500 as described herein.

Brazing method 630 further includes selecting 636 plurality of abrasive particles 218, 318, 418, and 518 (shown in FIGS. 4, 5, 6, and 7, respectively) to be used. Abrasive particles 218, 318, 418, and 518 may include substantially all TaC. Also, abrasive particles 218, 318, 418, and 518 may include cBN and $Al_2O_3$ in predetermined ratios. Further, abrasive particles 218, 318, 418, and 518 may include cBN, $Al_2O_3$ and $ZrO_2$ in predetermined ratios. Moreover, abrasive particles 218, 318, 418, and 518 may include may include TaC and $Al_2O_3$ in predetermined ratios. Also, abrasive particles 218, 318, 418, and 518 may include TaC and $Al_2O_3$ in predetermined ratios. Further, abrasive particles 218, 318, 418, and 518 may include polycrystalline alumina (sol-gel).

Examples of predetermined ratios, or percentages of cBN and $Al_2O_3$ include, without limitation, ranges between approximately 20% and approximately 50% cBN and ranges between approximately 80% and approximately 50% $Al_2O_3$. Also, examples of predetermined ratios, or percentages of TaC and $Al_2O_3$ include, without limitation, ranges between approximately 20% and approximately 80% TaC and ranges between approximately 80% and approximately 20% $Al_2O_3$. Abrasive particles 218, 318, 418, and 518 are sized to have an equivalent diameter 220, 320, 420, and 520, respectively, within a range between approximately 50.8μ (2 mils) and approximately 500μ (20 mils). Plurality of abrasive particles 218, 318, 418, and 518 are embedded 638 within the braze matrix to form unbrazed abrading portion 204, 304, 404, and 504 that is applied 640 to airfoil tip substrate 184. Abrasive particles 218, 318, 418, and 518 are separated from each other with an equivalent spacing 222, 322, 422, and 522, respectively, ranging between approximately 20μ (less than one mil) and approximately 500μ (20 mils).

Turbine bucket 160 with unbrazed abrading portion 204, 304, 404, and 504 is brazed 642 to form brazed abrading portion 204, 304, 404, and 504. Upon completion of brazing 640, abrading portion 204, 304, 404, and 504 includes at least one abrading matrix layer 212, 312, 412, and 512, respectively, having a thickness 214, 314, 414, and 514, respectively, within a range between approximately 50.8μ (2 mils) and approximately 500μ (20 mils). Abrading matrix layer 212, 312, 412, and 512 define an abrading matrix layer surface 216, 316, 416, and 516, respectively.

Also, upon completion of brazing 640, abrasive particles 218, 318, 418, and 518 have a range of Vickers hardness values between approximately 1000 and approximately 4800. Ceramic abrading matrix layer 212, 312, 412, and 512 has a range of Vickers hardness values between approximately 400 and approximately 1200. Therefore, the hardness values of abrasive particles 218, 318, 418, and 518 are greater than the hardness values of abrading matrix layer 212, 312, 412, and 512, respectively, which in turn are greater than the hardness values of abradable shroud 202.

In some embodiments, a portion of uncoated abrasive particles 418 may be formed from SiC with an equivalent diameter 432 and coated with at least one coating layer 428 to form a plurality of coated abrasive particles 430 (all shown in FIG. 6). Also, in some embodiments, a layer of bond coat, i.e., a ceramic underlayer may be formed over airfoil tip substrate 184 prior to applying 638 unbrazed abrading portion 204 to airfoil tip substrate 184 to decrease a potential for contact between uncoated abrasive particles 418 (formed from SiC) and/or coated abrasive particles 430 and substrate 184.

In some embodiments, an electrolytic method 650 is used to facilitate disposing 620 abrading portion 204, 304, 404, and 504 over airfoil tip substrate 184. Electrolytic method 650 includes forming 652 an electrolytic solution that includes one of MCrAlY and MCrAlX and may include metallic materials, e.g., without limitation, Ni, Al, and Pt in any combination. Electrolytic method 650 also includes selecting 654 plurality of abrasive particles 218, 318, 418, and 518 (shown in FIGS. 4, 5, 6, and 7, respectively) to be used.

Abrasive particles 218, 318, 418, and 518 may include substantially all of one of tantalum carbide (TaC), aluminum oxide ($Al_2O_3$), or ziconia ($ZrO_2$). Also, abrasive particles 218, 318, 418, and 518 may include cubic boron nitride (cBN) and $Al_2O_3$ in predetermined ratios. Further, abrasive particles 218, 318, 418, and 518 may include may include cBN, $Al_2O_3$ and $ZrO_2$ in predetermined ratios. Moreover, abrasive particles 218, 318, 418, and 518 may include $Al_2O_3$ and $ZrO_2$ fused together in predetermined ratios. Also, abrasive particles 218, 318, 418, and 518 may include TaC and $Al_2O_3$ in predetermined ratios. Further, abrasive particles 218, 318, 418, and 518 may include polycrystalline alumina (sol-gel).

Examples of predetermined ratios, or percentages of cBN and $Al_2O_3$ include, without limitation, ranges between approximately 20% and approximately 50% cBN and ranges between approximately 80% and approximately 50% $Al_2O_3$. Also, examples of predetermined ratios, or percentages of TaC and $Al_2O_3$ include, without limitation, ranges between approximately 20% and approximately 80% TaC and ranges between approximately 80% and approximately 20% $Al_2O_3$. Abrasive particles 218, 318, 418, and 518 are sized to have an equivalent diameter 220, 320, 420, and 520, respectively, within a range between approximately 50.8μ (2 mils) and approximately 500μ (20 mils). Plurality of abrasive particles 218, 318, 418, and 518 are mixed 656 within the electrolytic solution. Airfoil tip substrate 184 is positioned 658 within the electrolytic solution to form abrading portion 204, 304, 404, and 504 on airfoil tip substrate 184. Abrasive particles 218, 318, 418, and 518 and metallic abrading matrix layer 212, 312, 412, and 512, respectively, are deposited 660 on airfoil tip substrate 184.

Upon completion of electrolytic method 650, turbine bucket 160 includes abrading portion 204, 304, 404, and 504 that includes at least one metallic abrading matrix layer 212, 312, 412, and 512, respectively, having a thickness 214, 314, 414, and 514, respectively, within a range between approximately 50.8μ (2 mils) and approximately 500μ (20 mils). Abrading matrix layer 212, 312, 412, and 512 define an abrading matrix layer surface 216, 316, 416, and 516, respectively. In addition, abrasive particles 218, 318, 418, and 518 are separated from each other with an equivalent spacing 222, 322, 422, and 522, respectively, ranging between approximately 20μ (less than one mil) and approximately 500μ (20 mils).

Also, upon completion of electrolytic method 650, abrasive particles 218, 318, 418, and 518 have a range of Vickers hardness values between approximately 1000 and approximately 4800. Metallic abrading matrix layer 212, 312, 412, and 512 has a range of Vickers hardness values between approximately 300 and approximately 500. Therefore, the hardness values of abrasive particles 218, 318, 418, and 518 are greater than the hardness values of abrading matrix layer 212, 312, 412, and 512, respectively, which in turn are greater than the hardness values of abradable shroud 202.

In some embodiments, a portion of uncoated abrasive particles 418 may be formed from SiC with an equivalent diameter 432 and coated with at least one coating layer 428 to form a plurality of coated abrasive particles 430. Also, in some embodiments, a layer of bond coat, i.e., a ceramic underlayer may be formed over airfoil tip substrate 184 prior to positioning 658 airfoil tip substrate 184 is the electrolytic solution to decrease a potential for contact between uncoated abrasive particles 418 (formed from SiC) and/or coated abrasive particles 430 and substrate 184.

In some embodiments, abrading portion 204, 304, 404, and 504 is disposed 620 over airfoil tip substrate 184 through a two-stage, hybrid process 670 that includes portions of both electrolytic and brazing methods. The first stage includes forming 672 a brazing compound that includes mixing at least one of Si, Ti, W, B, and Zr with at least one of NiCr and Ni. The first stage also includes mixing 674 a plurality of abrasive particles 218, 318, 418, and 518 within the brazing compound. The first stage further includes applying 676 the brazing compound to substrate 184. The first stage also includes brazing 678. The second stage includes forming 680 an electrolytic compound that includes MCrAlY. The second stage also includes positioning 682 substrate 184 in the electrolytic compound and filling 684 in at least a portion of the spacing therebetween abrasive particles 218, 318, 418, and 518 with the MCrAlY matrix compound. The second stage further includes using electrolytic methods to finish forming abrading matrix layer 212, 312, 412, and 512 with embedded abrasive particles 218, 318, 418, and 518 as described above for methods 630 and 650 individually.

In some embodiments, abrading portion 204, 304, 404, and 504 is disposed 620 over airfoil tip substrate 184 through thermal spraying 690. A thermal spray solution is mixed 692 that includes one of MCrAlY and MCrAlX and may include metallic materials, e.g., without limitation, Ni, Al, and Pt in any combination. Thermal spraying method 690 also includes mixing 694 plurality of abrasive particles 218, 318, 418, and 518 that includes substantially all $Al_2O_3$ into the thermal spray solution. The hot spray is applied 696 on substrate 184 and the molten matrix and $Al_2O_3$ particles cool 698 thereon to form abrading matrix layer 212, 312, 412, and 512 with embedded abrasive particles 218, 318, 418, and 518 as described above.

Figure 10:
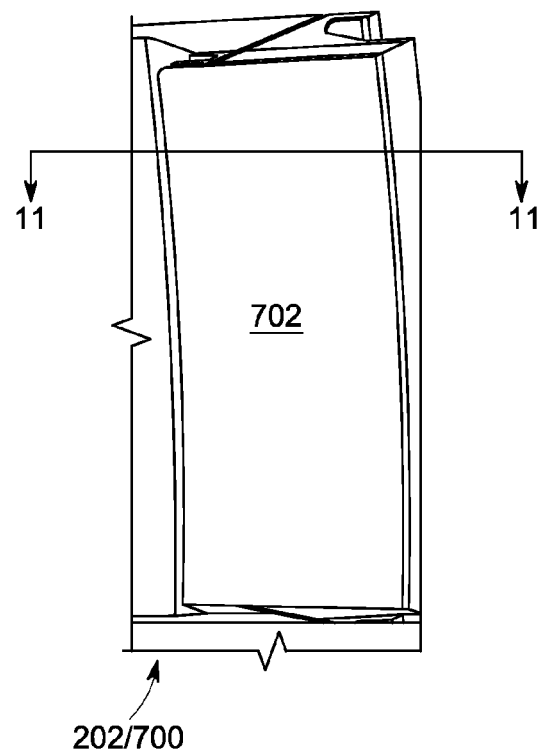
FIG. 10 is a schematic view of an exemplary portion of an exemplary abradable shroud with a substantially smoothed surface that may be used with the gas turbine engine shown in FIG. 3.
Figure 11:
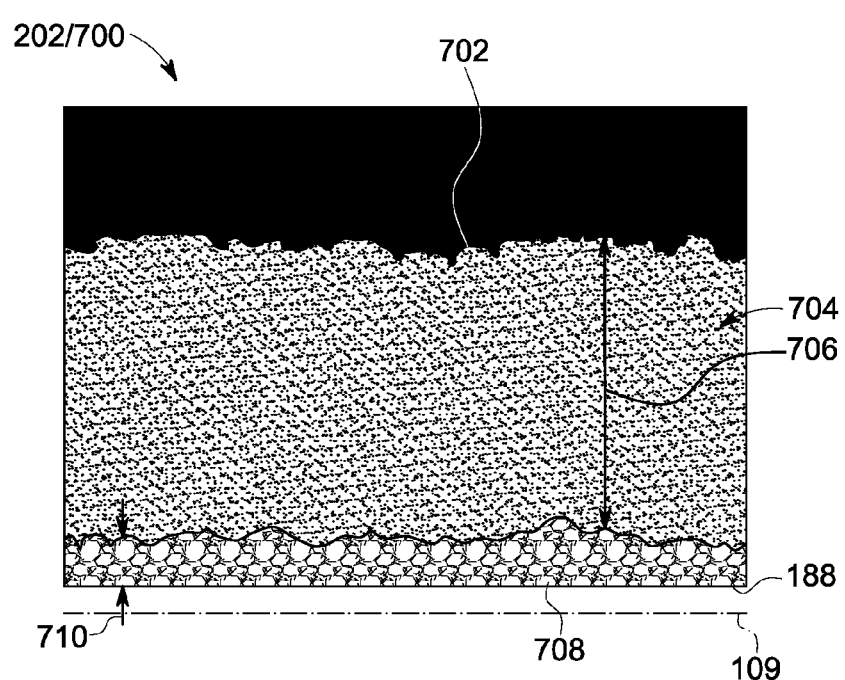
FIG. 11 is an enlarged schematic view of the portion of the abradable shroud shown in FIG. 10 taken along line 11-11.

FIG. 10 is a schematic view of an exemplary portion 700 of abradable shroud 202 with a substantially smoothed surface 702 that may be used with gas turbine engine 100 (shown in FIG. 3). FIG. 11 is an enlarged schematic view of portion 700 of abradable shroud 202 taken along line 11-11 (shown in FIG. 10). In the exemplary embodiment, portion 700 of abradable shroud 202 includes at least one layer 704 of DVC DySZ formed thereon. During operation of gas turbine engine 100, surface 702 of DVC DySZ layer 704 is directly exposed to hot combustion gases 152 (shown in FIG. 1). Also, in the exemplary embodiment, layer 704 has a thickness 706 that has a range between approximately 0.5 millimeters (mm) (20 mils) and approximately 1.5 mm (60 mils), with a preferred thickness of approximately 1 mm (40 mils). DVC DySZ layer 704 has a porosity value less that 5%. Further, in the exemplary embodiment, DVC DySZ layer 704 is formed over a first layer 708 of a high-temperature material, e.g., without limitation, a TBC, formed on turbine casing inner surface 188. Alternatively, DVC DySZ layer 704 is formed directly on surface 188. Layer 708 has a thickness 710 that has a range between approximately 0.05 millimeters (mm) (2 mils) and approximately 0.15 mm (6 mils), with a preferred thickness of approximately 0.1 mm (4 mils).

Figure 12:
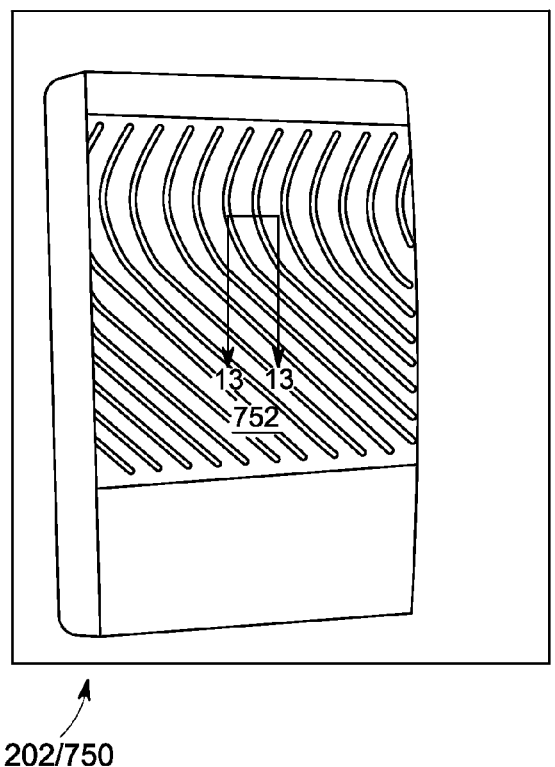
FIG. 12 is a schematic view of an exemplary portion of an exemplary abradable shroud with a patterned surface that may be used with the gas turbine engine shown in FIG. 3.
Figure 13:
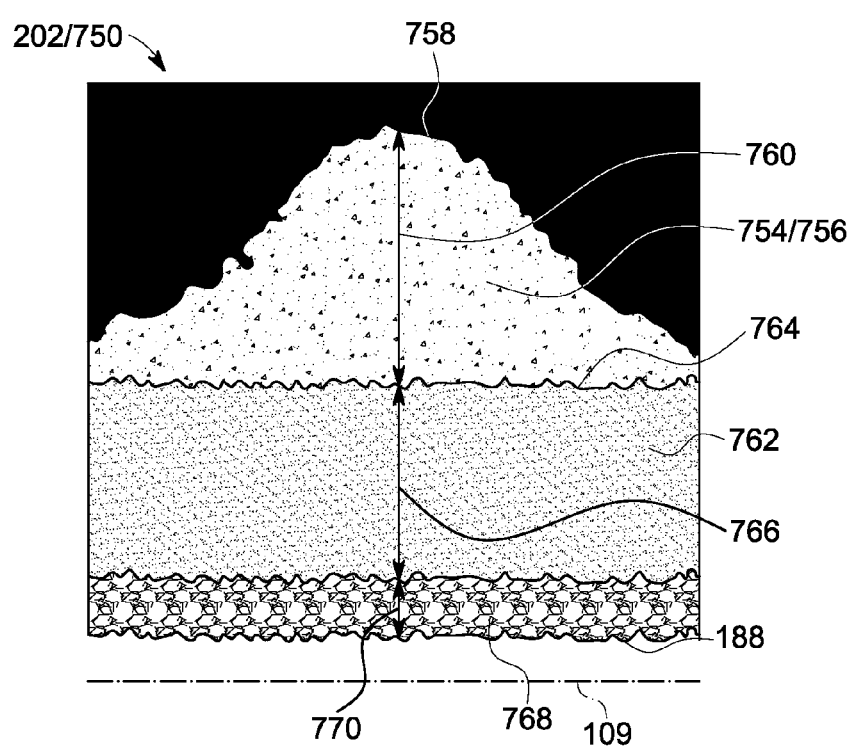
FIG. 13 is an enlarged schematic view of the portion of the abradable shroud shown in FIG. 12 taken along line 13-13.

FIG. 12 is a schematic view of an exemplary portion 750 of exemplary abradable shroud 202 with a patterned surface 752 that may be used with gas turbine engine 100 (shown in FIG. 3). FIG. 13 is an enlarged schematic view of portion 750 of abradable shroud 202 taken along line 13-13 (shown in FIG. 12). In the exemplary embodiment, portion 750 of abradable shroud 202 includes at least one patterned layer 754 of DVC YSZ formed thereon. Patterned layer 754 is formed as a plurality of mounds 756 with a peak 758 that defines a height 760. Height 760 has a range between approximately 1 mm (40 mils) and approximately 1.5 mm (60 mils), with a preferred height of approximately 1.25 mm (50 mils).

Also, in the exemplary embodiment, portion 750 of abradable shroud 202 includes at least one layer 762 of DVC YSZ formed on which patterned layer 754 of DVC YSZ is formed. Layer 762 of DVC YSZ defines a substantially smoothed surface 764. During operation of gas turbine engine 100, mounds 754 of DVC YSZ and surface 764 of DVC YSZ layer 762 are directly exposed to hot combustion gases 152 (shown in FIG. 1). Layer 762 has a thickness 766 that has a range between approximately 0.5 millimeters (mm) (20 mils) and approximately 1.5 mm (60 mils), with a preferred thickness of approximately 1 mm (40 mils).

DVC YSZ layers 754 and 762 have a porosity value less than 5%. Further, in the exemplary embodiment, DVC YSZ layer 762 is formed over a first layer 768 of a high-temperature material, e.g., without limitation, a TBC, formed on turbine casing inner surface 188. Alternatively, DVC YSZ layer 762 is formed directly on surface 188. Layer 768 has a thickness 770 that has a range between approximately 5 millimeters (mm) (200 mils) and approximately 15 mm (600 mils), with a preferred thickness of approximately 10 mm (400 mils).

Patterned surface 752 may be formed through any methods that enable operation of gas turbine engine 100 as described herein, including, without limitation, machining operations, partial masking, and varying the manufacturing process parameters.

Referring to FIGS. 10 through 13, forming abradable shroud 202 as described herein facilitates increased erosion resistance over commonly used abradables due to the relatively low porosity values of shroud 202. Moreover, use of the DVC materials facilitates increasing a life expectancy of shroud 202. In addition, in some instances, DVC DySZ abradable materials may be preferred over DVC YSZ materials. For example, DVC DySZ abradable materials increase a thermal cycle resistance and erosion resistance of abradable shrouds as compared to DVC YSZ abradable materials. Also, DVC DySZ abradable materials may also be used as a portion of an improved TBC system because of the low thermal conductivity of DVC DySZ as compared to DVC YSZ.

While the above describes a plurality of embodiments for a seal system for a turbine bucket assembly, such embodiments may also be used with compressor blade assemblies.

The above-described seal systems provide a cost-effective method for sealing turbomachines during operation. The embodiments described herein facilitate defining an airfoil tip clearance that facilitates increasing an efficiency of the turbomachines, decreasing a potential for airfoil rubs against stationary portions, and decreasing a potential for erosion and spallation of abradable shrouds. Specifically, the systems and methods described herein use dense abradable materials for the shrouds rather than standard thermal barrier coatings (TBCs). Therefore, the shroud coating described herein has a hardness value sufficient to decrease particulate erosion, especially along patterned-contours. Also, specifically, the systems and methods described herein use abrasive particles anchored in a either a ceramic or metallic matrix such that the hardness values of the abrasive particles is greater than the hardness values of the dense abradable materials. Therefore, specifically, the hardened abrasive particles cut into the dense abradable materials, thereby decreasing a potential for accelerated airfoil tip wear and temperature-induced rubbing and subsequent spallation of the shrouds. Moreover, the materials selected to form the hardened abrasive particles are environmentally stable such that they do not oxidize away at elevated operating temperatures at and above approximately 927° C. (1700° F.). Furthermore, the materials used to form the hardened abrasive particles are compatible with the base material in the airfoil substrates, and/or the hardened abrasive particles are encased in an environmental barrier coating, and/or a ceramic underlayer is formed over the airfoil substrate to decrease a potential for contact between the hardened abrasive particles and the substrate. Also, the hardened abrasive particles are sized to extend a predetermined distance from a surface of the anchoring matrix to decrease a potential for contact between the matrix and the dense abradable materials.

An exemplary technical effect of the methods and systems described herein includes at least one of: (a) increasing an efficiency of turbomachines over a wide range of operating conditions; (b) decreasing a potential for airfoil rubs against stationary portions of turbomachines; (c) decreasing a potential for erosion and spallation of abradable shrouds; and (d) decreasing a potential for temperature-induced rubbing between stationary and rotating portions of turbomachines.

Exemplary embodiments of seal systems for operating turbomachines and methods for operating and forming the systems are described above in detail. The seal systems and methods of operating and forming such systems are not limited to the specific embodiments described herein, but rather, components of systems and/or steps of the methods may be utilized independently and separately from other components and/or steps described herein. For example, the methods may also be used in combination with other systems requiring operational sealing and methods, and are not limited to practice with only the seal systems and turbomachines and methods as described herein. Rather, the exemplary embodiment can be implemented and utilized in connection with many other sealing applications.

Although specific features of various embodiments of the invention may be shown in some drawings and not in others, this is for convenience only. In accordance with the principles of the invention, any feature of a drawing may be referenced and/or claimed in combination with any feature of any other drawing.

What is claimed is:

1. A seal system for an apparatus that includes a rotatable portion and a stationary portion extending over at least a portion of the rotatable portion, the stationary portion includes an inner surface, the rotatable portion includes at least one airfoil assembly coupled thereto, wherein the at least one airfoil assembly includes a substrate, said seal system comprising:
an abradable portion comprising at least one abradable layer of an abradable material formed over at least a portion of the inner surface, wherein said abradable portion comprises an abradable surface face; and
an abrading portion disposed over at least a portion of the substrate, said abrading portion comprising:
at least one abrading layer formed on at least a portion of said substrate, wherein said at least one abrading layer defines an abrading layer surface; and
a plurality of abrasive particles embedded within said at least one abrading layer, wherein at least a portion of said plurality of abrasive particles extends beyond said abrading layer surface a first predetermined distance within a range between approximately 0% and 40% of an equivalent diameter of said plurality of abrasive particles, said plurality of abrasive particles are separated from each other with a spacing range between approximately 20µ and approximately 500µ, and said plurality of abrasive particles comprises at least one of:
substantially all of one of tantalum carbide (TaC), aluminum oxide ($Al_2O_3$), and ziconia ($ZrO_2$);
cubic boron nitride (cBN) and $Al_2O_3$ in predetermined ratios;
cBN, $Al_2O_3$, and $ZrO_2$ in predetermined ratios;
$Al_2O_3$ and $ZrO_2$ fused together in predetermined ratios; and
TaC and $Al_2O_3$ in predetermined ratios,
wherein the abrading portion rubs against the abradable portion and defines a clearance gap between the abrading portion and the abradable portion, further defines a second predetermined distance between said abrading layer surface and said abradable surface face, and further wherein the clearance gap comprises a predetermined range of values, and further wherein said first predetermined distance and said second predetermined distance reduce a potential of contact between said abrading layer and said abradable shroud.

2. The seal system in accordance with claim 1, wherein said plurality of abrasive particles further comprises:
particles sized in a range between approximately 50.8 microns (µ) and approximately 500µ.

3. The seal system in accordance with claim 1, wherein said at least one abrading layer comprises at least one of at least one metallic layer and at least one ceramic layer.

4. The seal system in accordance with claim 1, wherein said at least one abrading layer has a first hardness value and said plurality of abrasive particles has a second hardness value, wherein the second hardness value is greater than the first hardness value.

5. The seal system in accordance with claim 1, wherein said plurality of abrasive particles further comprises at least some silicon carbide (SiC) particles comprising an external inert particle coating comprising at least one of $Al_2O_3$ and mullite.

6. The seal system in accordance with claim 1, wherein said at least one abrading layer comprises at least one of yttria-stabilized zirconia (YSZ), zirconia-toughened alumina, alumina-toughened zirconia, $Al_2O_3$, and hafnia ($HfO_2$).

7. The seal system in accordance with claim 1, wherein said at least one abrading layer comprises at least one of:
a chromium-aluminum-yttrium alloy (MCrAlY), wherein M comprises at least one of nickel (Ni), cobalt (Co), and iron (Fe) in any combination thereof;
a chromium-aluminum alloy (MCrAlX), wherein M comprises at least one of nickel (Ni), cobalt (Co), and iron (Fe) in any combination thereof, and X comprises at least one of hafnium (Hf), Y, Si, and Ta in any combination thereof; and
an alloy comprising at least two of nickel (Ni), aluminum (Al), and platinum (Pt) in any combination thereof.

8. The seal system in accordance with claim 1, wherein said at least abrading one layer has a thickness within a range between approximately 50.8µ, and approximately 500µ.

9. The seal system in accordance with claim 1, wherein said abradable portion comprises at least one of:
dense vertically-cracked (DVC) yttria-stabilized zirconia (YSZ); and
dense vertically-cracked (DVC) dysprosia-stabilized zirconia (DySZ).

10. The seal system in accordance with claim 9, wherein said DVC YSZ has a porosity value of less than 5%.

11. The seal system in accordance with claim 9, wherein said DVC DySZ has a porosity value of less than 5%.

12. The seal system in accordance with claim 9, wherein said abradable portion is formed with a thickness of at least approximately 500µ.

13. The seal system in accordance with claim 1, wherein said clearance gap reduces a flow of a working fluid between said stationary portion and said rotatable portion.

14. A method of assembling a seal system for an apparatus, said method comprising:
providing a rotatable portion, wherein the rotatable portion includes at least one airfoil assembly coupled thereto, the at least one airfoil assembly includes a substrate;
extending a stationary portion over the at least a portion of the rotatable portion, wherein the stationary portion includes an inner surface;
forming an abradable portion comprising at least one layer of abradable material on at least a portion of the inner surface and further comprising an abradable surface face; and
forming an abrading portion comprising at least one matrix layer comprising an abrading layer surface, on at least a portion of the substrate, wherein the at least one matrix layer includes a plurality of abrasive particles embedded within the at least one matrix layer, wherein at least a portion of said plurality of abrasive particles extends beyond said abrading layer surface a first predetermined distance within a range between approximately 0% and 40% of an equivalent diameter of said plurality of abrasive particles, wherein the plurality of abrasive particles are separated from each other with a spacing range between approximately 20μ and approximately 500μ, wherein the plurality of abrasive particles includes at least one of:
substantially all of one of tantalum carbide (TaC), aluminum oxide ($Al_2O_3$), and ziconia ($ZrO_2$);
cubic boron nitride (cBN) and $Al_2O_3$ in predetermined ratios;
cBN, $Al_2O_3$, and $ZrO_2$ in predetermined ratios;
$Al_2O_3$ and $ZrO_2$ fused together in predetermined ratios; and
TaC and $Al_2O_3$ in predetermined ratios,
wherein the abrading portion rubs against the abradable portion and defines a clearance gap between the abrading portion and the abradable portion, further defines a second predetermined distance between said abrading layer surface and said abradable surface face, and further wherein the clearance gap comprises a predetermined range of values, and further wherein said first predetermined distance and said second predetermined distance reduce a potential of contact between said abrading layer and said abradable shroud.

15. The method in accordance with claim 14, wherein forming at least one layer of abradable material on the inner surface comprises spraying at least one of dense vertically-cracked (DVC) yttria-stabilized zirconia (YSZ) and dense vertically-cracked (DVC) dysprosia-stabilized zirconia (DySZ) on the inner surface, wherein the at least one layer of abradable material has a first hardness value, and the plurality of abrasive particles has a second hardness value, the second hardness value is greater than the first hardness value.

16. The method in accordance with claim 14, wherein forming at least one matrix layer comprises forming a braze matrix comprising mixing at least one of silicon (Si), titanium (Ti), tungsten (W), boron (B) and zirconium (Zr) with at least one of nickel chrome (NiCr) and Ni.

17. The method in accordance with claim 14, wherein forming at least one matrix layer comprises:
forming a chromium-aluminum-yttrium alloy (MCrAlY) matrix, wherein M comprises at least one of nickel (Ni), cobalt (Co), and iron (Fe) in any combination thereof; and
forming at least one MCrAlY matrix layer through an electrolytic process.

18. The method in accordance with claim 14, wherein forming at least one matrix layer comprises:
forming a brazing compound comprising mixing at least one of silicon (Si), titanium (Ti), tungsten (W), boron (B) and zirconium (Zr) with at least one of nickel chrome (NiCr) and Ni;
applying the brazing compound to the at least a portion of the substrate;
brazing the plurality of particles to the substrate;
forming an electrolytic compound comprising forming a MCrAlY matrix compound, wherein M comprises at least one of nickel (Ni), cobalt (Co), and iron (Fe) in any combination thereof; and
applying the electrolytic compound to the brazed particles and filling in at least a portion of the spacing therebetween.

19. The method in accordance with claim 14, wherein said clearance gap reduces a flow of a working fluid between said stationary portion and said rotatable portion.

20. A method of operating an apparatus that includes a rotatable portion and a stationary portion extending over at least a portion of the rotatable portion, the stationary portion includes an inner surface, the rotatable portion includes at least one airfoil assembly coupled thereto, said method comprising:
inducing a rotation in the rotatable member such that an abrading portion of a seal system rubs against an abradable portion of the seal system, wherein the abradable portion comprises an abradable surface face and includes at least one layer of at least one of dense vertically-cracked (DVC) yttria-stabilized zirconia (YSZ) and dense vertically-cracked (DVC) dysprosia-stabilized zirconia (DySZ) formed on the stationary portion, the abradable portion having a first hardness value, and the abrading portion includes a plurality of abrasive particles embedded within at least one matrix layer, wherein said at least one matrix layer defines an abrading layer surface, and further wherein at least a portion of said plurality of abrasive particles extends beyond said abrading layer surface a first predetermined distance within a range between approximately 0% and 40% of an equivalent diameter of said plurality of abrasive particles, wherein the plurality of abrasive particles are separated from each other with a spacing range between approximately 20μ and approximately 500μ, wherein the plurality of abrasive particles has a second hardness value that is greater than the first hardness value, and the plurality of abrasive particles includes at least one of:
substantially all of one of tantalum carbide (TaC), aluminum oxide ($Al_2O_3$), and ziconia ($ZrO_2$);
cubic boron nitride (cBN) and $Al_2O_3$ in predetermined ratios;
cBN, $Al_2O_3$, and $ZrO_2$ in predetermined ratios;
$Al_2O_3$ and $ZrO_2$ fused together in predetermined ratios; and
TaC and $Al_2O_3$ in predetermined ratios; and
removing at least a portion of the abradable portion with the abrading portion; and
defining a clearance gap between the abradable portion and the abrading portion, wherein the clearance gap comprises a predetermined range of values, and further defining a second predetermined distance between said abrading layer surface and said abradable surface face wherein said first predetermined distance and said second predetermined distance reduce a potential of contact between said matrix layer and said abradable shroud.

21. The method in accordance with claim 20, wherein the abradable portion is formed with at least one of a substantially smoothed surface and a patterned surface.

22. The method in accordance with claim 20, wherein said clearance gap reduces a flow of a working fluid between said stationary portion and said rotatable portion.

* * * * *